US008956018B2

(12) United States Patent
Deshpande et al.

(10) Patent No.: US 8,956,018 B2
(45) Date of Patent: Feb. 17, 2015

(54) SOLID-STATE LIGHTING APPARATUS

(75) Inventors: Shirish Devidas Deshpande, Pune (IN); Prafulla Madhukar Thote, Pune (IN)

(73) Assignee: Prafulla Madhukar Thote, Pune (IN)

( * ) Notice: Subject to any disclaimer, the term of this patent is extended or adjusted under 35 U.S.C. 154(b) by 1033 days.

(21) Appl. No.: 12/797,651

(22) Filed: Jun. 10, 2010

(65) Prior Publication Data

US 2010/0315252 A1 Dec. 16, 2010

Related U.S. Application Data

(60) Provisional application No. 61/229,152, filed on Jul. 28, 2009.

(30) Foreign Application Priority Data

Jun. 10, 2009 (IN) ......................... 1394/MUM/2009

(51) Int. Cl.

| | |
|---|---|
| ***B60Q 1/06*** | (2006.01) |
| ***F21V 29/00*** | (2006.01) |
| ***B60Q 1/00*** | (2006.01) |
| ***F21S 4/00*** | (2006.01) |
| ***F21V 21/00*** | (2006.01) |
| ***F21S 8/08*** | (2006.01) |
| *F21V 15/01* | (2006.01) |
| *F21W 131/103* | (2006.01) |
| *F21Y 101/02* | (2006.01) |

(52) U.S. Cl.
CPC ............... *F21V 29/004* (2013.01); *F21S 8/088* (2013.01); *F21V 29/2293* (2013.01); *F21V 15/01* (2013.01); *F21W 2131/103* (2013.01); *F21Y 2101/02* (2013.01)
USPC ....... 362/373; 362/547; 362/294; 362/249.02

(58) Field of Classification Search
USPC ............... 362/190, 191, 218, 217.14, 217.16, 362/249.01, 249.02, 294, 373, 431, 800, 362/802, 547
See application file for complete search history.

(56) References Cited

U.S. PATENT DOCUMENTS

| | | | | |
|---|---|---|---|---|
| 6,639,360 | B2 * | 10/2003 | Roberts et al. | 313/512 |
| 7,267,461 | B2 * | 9/2007 | Kan et al. | 362/373 |
| 2007/0247842 | A1 * | 10/2007 | Zampini et al. | 362/227 |
| 2008/0278957 | A1 * | 11/2008 | Pickard et al. | 362/373 |
| 2009/0046466 | A1 * | 2/2009 | Yang et al. | 362/294 |
| 2009/0147519 | A1 * | 6/2009 | Klipstein et al. | 362/249.02 |
| 2009/0159905 | A1 * | 6/2009 | Chen | 257/88 |
| 2009/0236087 | A1 * | 9/2009 | Horio | 165/185 |
| 2010/0110679 | A1 * | 5/2010 | Teng et al. | 362/235 |

* cited by examiner

*Primary Examiner* — Jong-Suk (James) Lee
*Assistant Examiner* — Alexander Garlen
(74) *Attorney, Agent, or Firm* — Hayes Soloway PC

(57) ABSTRACT

The invention provides lighting apparatuses which are power efficient, environment friendly and long lasting and can be manufactured with high degree of speed, accuracy and flexibility. The lighting apparatuses are easily serviceable and can be produced, transported economically and have higher economical value even on completion of life term of the lighting apparatuses. The present invention reduce the waste of raw material thereby utilizing maximum percentage raw material for produce solid state lighting fixtures using CAD and CNC process and provides retrofitting lighting apparatuses which can be replaced without making considerable changes in existing infrastructure.

15 Claims, 15 Drawing Sheets

| Luminaire Input Voltage | Input Current | Luminaire Watts | Power Factor |
|---|---|---|---|
| 120.0VAC | 0.7428A | 86.85W | 0.999 |
| Radiant Flux mW | Luminous Flux lumen | Color Temperature K | Color Rend Index Ra |
| 18460 | 5728 | 6493 | 74.9 |
| Chroma x | Chroma y | Chroma u | Chroma v |
| 0.3115 | 0.339 | 0.1933 | 0.3156 |

| Wavelength in nm | Spectral Flux in mW/nm | Wavelength in nm | Spectral Flux in mW/nm |
|---|---|---|---|
| 350 | 2.0271 | 610 | 61.8827 |
| 360 | 1.8354 | 620 | 53.3828 |
| 370 | 1.907 | 630 | 45.1122 |
| 380 | 2.107 | 640 | 37.269 |
| 390 | 2.0619 | 650 | 30.8285 |
| 400 | 2.1709 | 660 | 25.1813 |
| 410 | 4.0454 | 670 | 20.074 |
| 420 | 15.0494 | 680 | 16.2792 |
| 430 | 48.8731 | 690 | 13.2628 |
| 440 | 115.4744 | 700 | 11.2975 |
| 450 | 161.5754 | 710 | 8.7644 |
| 460 | 92.6861 | 720 | 6.9842 |
| 470 | 52.1975 | 730 | 5.8308 |
| 480 | 34.2978 | 740 | 4.5313 |
| 490 | 35.1809 | 750 | 4.3574 |
| 500 | 48.5554 | 760 | 3.6186 |
| 510 | 66.479 | 770 | 3.0525 |
| 520 | 81.3264 | 780 | 3.5123 |
| 530 | 90.7401 | 790 | 2.4297 |
| 540 | 95.2397 | 800 | 2.4203 |
| 550 | 95.8452 | 810 | 3.5167 |
| 560 | 95.1526 | 820 | 3.5248 |
| 570 | 90.9181 | 830 | 3.9883 |
| 580 | 85.2805 | 840 | 4.6137 |
| 590 | 78.768 | 850 | 5.5516 |
| 600 | 70.8242 | | |

SOLID-STATE LIGHTING APPARATUS

PRIORITY INFORMATION

This application claims priority under 35 U.S.C. 119(e) from U.S. Provisional Patent Application No. 61/229,152, filed Jul. 28, 2009, for a "Long Lasting, Energy and Thermally Efficient, Customizable Solid-State Lighting Fixtures," by Desphande, is hereby incorporated by reference in its entirety for its teachings.

FIELD OF THE INVENTION

This invention relates to environment friendly general illumination apparatuses. The invention particularly relates to Eco-friendly, long lasting, energy efficient, solid-state lighting apparatuses.

BACKGROUND OF INVENTION

Global concerns have been raised regarding the amount of power consumed by currently used incandescent lamps and high pressure sodium vapor lamps, and by extension, the amount of atmospheric CO2 released due to such power consumption. Also incandescent lamps have shorter life span and use hazardous materials, thus attracting high maintenance costs and are non-friendly to ecosystem and unsustainable by nature. Because of this, solid-state based illumination has received attention as an optimum energy-conserving, eco-friendly light source, of future.

The proven unsustainability of conventional incandescent lighting sources has led to the change in energy policies across the world. To combat climate change the European Union has agreed to phase out conventional light sources that are energy inefficient. According to an EU Directive, from 1 Sep. 2009 manufacturers and importers may no longer sell incandescent lamps with an output of 80 W (950 lm) or more or which are frosted and not in Energy Class A. Clear lamps with more than 950 lm must achieve at least Energy Class C, and ones with less than 950 lm at least Energy Class E. Lamps in Energy Classes F and G will be banned from 1 Sep. 2009. For the lighting industry there are already phase-out scenarios for household lighting and lighting in the tertiary sector (street, office and industry lighting) and these scenarios are currently being discussed. The less efficient light sources will start being phased out as early as this year.

Cuba exchanged all incandescent light bulbs for CFLs, and banned the sale and import of them in 2005. Brazil and Venezuela phased out incandescent light bulbs in 2005. In Argentina, selling and importing incandescent light bulbs will be forbidden starting 31 Dec. 2010. In Canada the provincial government has announced intention to ban the sale of incandescent light bulbs by 2012. In USA, federal Clean Energy legislation effectively banned (by January 2014) incandescent bulbs that produce 310-2600 lumens of light. Bulbs outside this range (roughly, light bulbs currently less than 40 Watts or more than 150 Watts) are exempt from the ban. Also exempt are several classes of specialty lights, including appliance lamps, "rough service" bulbs, 3-way, colored lamps, and plant lights.

Philippines, In February 2008, called for a ban of incandescent light bulbs by 2010 in favor of more energy-efficient fluorescent globes to help cut greenhouse gas emissions and household costs during her closing remarks at the Philippine Energy Summit.

Switzerland banned the sale of all light bulbs of the Energy Efficiency Class F and G, which affects a few types of incandescent light bulbs. Most normal light bulbs are of Energy Efficiency Class E, and the Swiss regulation has exceptions for various kinds of special-purpose and decorative bulbs.

The Irish government was the first European Union (EU) member state to ban the sale of incandescent light bulbs. It was later announced that the member states of the EU agreed to a phasing out of incandescent light bulbs by 2012. United Kingdom has enlisted the help of retailers with a voluntary, staged phase out.

In February 2007 the Australian Federal Government announced the introduction of minimum energy performance standards (MEPS) for lighting products.

Though the very unsustainable nature of the incandescent lamps is now well understood by the masses but the alternatives that we currently have e.g. CFLs (compact fluorescent lamps) are also not the best choice.

CFLs, like all fluorescent lamps, contain small amounts of mercury as vapor inside the glass tubing, averaging 4.0 mg per bulb. A broken compact fluorescent lamp will release its mercury content. Safe cleanup of broken compact fluorescent lamps differs from cleanup of conventional broken glass or incandescent bulbs. Because household users in most regions have the option of disposing of these products in the same way they dispose of other solid waste most CFLs are going to municipal solid waste instead of being properly recycled.

Moreover the cost of CFLs is higher than incandescent light bulbs. Typically this extra cost may be repaid in the long-term as CFLs use less energy and have longer operating lives than incandescent bulbs. However, there are some areas where the extra cost of a CFL may never be repaid, typically where bulbs are used relatively infrequently such as in little-used closets and attics. It is also currently not possible to obtain CFL versions of the range of colours and effects. In the past decade, hundreds of Chinese factory workers who manufacture CFLs for export to first world countries were being poisoned and hospitalized because of being exposed to mercury (The Sunday Times, May 3, 2009).

To overcome the economic, environmental and health issues associated with the conventional incandescent lights and CFLs (Compact fluorescent lamps), the alternative solution for illumination purposes, use of environment friendly general illumination fixtures based on smart use of solid-state lighting devices.

Solid-state lighting has the potential to revolutionize the lighting industry. Light-emitting diodes (LEDs)—commonly used in signs, signals and displays—are rapidly evolving to provide light sources for general illumination. This technology holds promise for lower energy consumption and reduced maintenance.

Characteristic Benefits of Solid State Lighting Include:

1. Long life—LEDs can provide 50,000 hours or more of life, in comparison, an incandescent light bulb lasts approximately 1,000 hours.
2. Energy savings—the best commercial white LED lighting systems provide more than twice the luminous efficacy (lumens per watt) of incandescent lighting. Colored LEDs are especially advantageous for colored lighting applications because filters are not needed.
3. Better quality light output—LEDs have minimum ultraviolet and infrared radiation.
4. Intrinsically safe—LED systems are low voltage and are generally cool to the touch.
5. Smaller flexible light fixtures—The small size of LEDs makes them useful for lighting tight spaces.
6. Durable—LEDs have no filament to break and can withstand vibrations. Last longer than any conventional light source 7. Reduced maintenance costs and energy costs
8. Focused Lighting—Directed light for increased system efficiency, directional resulting in highly controllable optical systems.
9. No moving parts, nothing to break, rupture, shatter, leak or contaminate the environment.
10. Green Technology—They emits no ultraviolet rays, infrared heat, and contains no mercury or lead.
11. Their long life and small size means far less waste.
12. Low Voltage current driven solid-state device operating at voltages as low as 3 VDC.
13. Cold Start Capable no ignition problems in cold environments—even down to −40° C.

The term "solid state" refers to the fact that light in an LED is emitted from a solid object—a block of semiconductor—rather than from a vacuum or gas tube, as is the case in traditional incandescent light bulbs and fluorescent lamps. Compared to incandescent lighting, however, SSL creates visible light with reduced heat generation or parasitic energy dissipation, similar to that of fluorescent lighting. In addition, its solid-state nature provides for greater resistance to shock, vibration, and wear, thereby increasing its lifespan significantly.

SSL devices are based on the semiconductor diode, When the diode is forward biased (switched on), electrons are able to recombine with holes and energy is released in the form of light. This effect is called electroluminescence and the color of the light is determined by the energy gap of the semiconductor. One of the major challenges in using SSL is the management of heat that dissipates from the junction diode. The efficiency of the LED depends largely on its heat-dissipation. The ambient temperature of the surrounding environment has an effect on the performance of the LED by leading to its self-heating. Overdriving it in a high ambient temperature may have an adverse effect on its light-emitting capacity. As the semiconductor die in the LED heats up, the light output of the LED decreases thus reducing its efficiency. Thus overheating of the LED may lead to a device failure.

The possible approach to compensate for LED self-heating effect is to design the body of fixture panel of the LED lighting device in a way that it dissipates as much heat as possible. The maximum heat dissipation can be achieved by virtue of the design and material of the lighting fixture panel on which the solid-state lighting devices are mounted upon.

Some of the inventions which illustrate various designs of the LED based illumination devices are:

US20080089069 filed by Medendorp teaches a solid state lighting subassembly or fixture which includes an anisotropic heat spreading material. In this invention the said anisotropic heat spreader in thermal contact with the solid state light source and the thermally conductive component of the lighting fixture so as to spread heat from the solid state light source in a preferential direction from the solid state light source to said thermally conductive component.

US20080062689 filed by Villard teaches an LED lighting fixture which includes a support plate having a first surface and a second surface, a plurality of panels connected to the first surface, in which each panel has an array of LEDs mounted to a planar surface thereof, and a power supply provided on the second surface of the support plate for driving the LED arrays.

U.S. Pat. No. 7,488,093 to Huang, et al. teaches an LED lamp which includes a frame, LED module, a heat sink and a cover. The LED module has a plurality of LEDs. The heat sink is mounted on the frame. The heat sink is attached to a side of the LED module for dissipating heat generated by the LEDs of the LED module. A heat pipe interconnects the heat sink and the cover. The cover is secured so as to shield a top portion of the heat sink and space from the top portion of the heat sink. In addition to the heat sink which can dissipate the heat generated by the LEDs, the heat is also dissipated by the cover via the heat pipe.

US20080231201 filed by Higley et al teaches a (LED) lighting fixture which comprising: a main housing having a bottom surface supporting an array of LEDs, a top surface and sides, at least one driver provided in a side housing attached to a side of the main housing to drive the LED array, the thickness of the driver housing equal to or greater than the thickness of the main housing, and plurality of heat spreading fins arranged on the top surface of the main housing.

The inventions mentioned above do not address the needs of customizability, fast production, maintenance, precision dimensional accuracy and affordability of the SSL fixture based lighting solution.

Thus, in the light of the above mentioned background of the art, it is evident that, there is a need for a solid-state lighting solution which:

provides efficient heat dissipation;
can be thermally efficient;
provides efficient power utilization;
can be environmental friendly;
can be custom manufactured with high degree of speed and flexibility;
can be easily serviceable; and
can be easily installed.
is affordable and low cost
can combat global warming

SUMMARY OF THE INVENTION

The principle object of the present invention is to provide lighting solutions which are power efficient, environment friendly and long lasting and can be custom manufactured with high degree of speed, accuracy and flexibility.

Another significant object of the invention is to provide the solid state lighting apparatuses which can achieve a power factor ratio >0.98 by utilizing a power supply unit to reduce the reactive power.

It is another object of the present invention to provide the solid state lighting apparatuses which can achieve more than 90% of the light in required area by mounting a lens on solid state lighting sources thereby preventing the scattering of the light in unnecessary areas. The amount of light which goes in undesired planes is minimal 0.01-20%.

It is another object of the present invention is to provide high degree of flexibility to adapt the design of the fixture according to utility by using CAD and CNC process.

Another object of the invention is to reduce the waste of raw material thereby utilizing maximum percentage raw material for produce solid state lighting fixtures using CAD and CNC process.

Still another object of the invention is to provide light weight lighting apparatuses which can be produced and transported economically and have a higher economical scrap value even on completion of life term of the lighting apparatuses.

Yet another object of the invention is to provide the solid state lighting apparatuses which are easily serviceable, wherein the power supply units are an independent component and can be replaced in case of failures.

Another object of the invention is to design the fixtures in a manner such that the entire bodies of the fixtures are acting as efficient heat sink, wherein the heat dissipation is maximum in x, y coordinates in lateral direction of the fixtures due to thickness (z-axis) of the fixtures in the range from 0.5 to 6 mm and the fixture is made of at least one thermally conductive sheet metal and the sheet metal material is selected from the set of aluminum, iron, steel, copper or combinations or alloys thereof.

Yet another object of the invention is to achieve larger surface area for dissipating heat in the solid state lighting apparatuses by exposing maximum surface area on both bottom and top sides of the fixture in x and y axis.

Yet another object of the invention is to achieve optimum and homogenous luminous photometry by inclining one or more plane of the fixture including the base plane of the fixture into desired angle, the said angle can be in the range from 0-360 degree.

Further object of the invention is to provide a photo sensor means which is coupled with AC or DC input power, the said photo sensor means configured to selectively control the power input to the solid state lighting apparatus, wherein the photo sensor means can be Day light sensor or High Accuracy Ambient Light Sensor.

A still another object of the invention is to provide retrofitting lighting apparatuses which can be replaced without making considerable changes in existing infrastructure. Their design aspects do not require special enclosures of physical infrastructure to be made. Taking an example of a street light, by virtue of the custom built retrofit design, the poles need not to be changed rather the retrofit design of proposed lighting apparatuses can replace the existing hoods.

Still another object of the invention is to provide lighting apparatuses which can be withstand extreme conditions of weather including rains, dust storms, snow fall, wind and heat.

A further object of the invention is to provide water proofing up to desired levels (ingress protection) to the lighting apparatuses which are achieved by virtue of its design.

Yet another object of the invention is to provide lighting apparatuses which are having anodized bodies to achieve corrosion and scratch free surfaces for smooth heat flow.

Another object of the invention is to protect top side heat dissipating areas of the fixture including primary heat sink and secondary heat sink and heat dissipating panels from any sort of bird droppings and/or any other droppings.

Before the present apparatuses, and methods enablement are described, it is to be understood that this invention in not limited to the particular apparatuses, and methodologies described, as there can be multiple possible embodiments of the present invention and which are not expressly illustrated in the present disclosure or drawings. It is also to be understood that the terminology used in the description is for the purpose of describing the particular versions or embodiments only, and is not intended to limit the scope of the present invention which will be limited only by the appended claims.

The present invention provides lighting solutions which are power efficient, environmental friendly and long lasting and can be custom manufactured with high degree of speed, accuracy and flexibility. The lighting fixtures of the current invention are also easily serviceable.

According to one embodiment of the invention, long lasting, energy efficient, solid-state lighting apparatus having customizable design, wherein the said apparatus comprises a fixture having at least one mounting surface, optionally one or more slit, hole or fin, selectively punched on the mounting surface of the fixture for achieving additional heat dissipation and minimizing the resistance to wind. One or more plane of the fixture including the base plane of the fixture can adjustably be inclined to achieve desired photometry.

The above said fixture is made of at least one thermally conductive sheet metal, wherein the thermally conductive sheet metal is selected from the set of aluminum, iron, steel, copper or combinations or alloys thereof. The fixture is manufactured by computerized numerically controlled (CNC) process; the said fixture is characterized in having;

i. the entire body of the fixture acting as primary heat sink, wherein the fixture is designed in a manner, such that the heat dissipation is maximum in x, y coordinates laterally of the fixture due to optimized thickness (z-axis) of the fixture maintained in the range from 0.5 to 6 mm;

ii. anodization for preventing corrosion and scratches thereby increasing thermal conductivity;

iii. a power supply unit enclosed in a housing of fixture, wherein the power supply unit provides required DC or AC voltage to one or more solid state light emitting sources, wherein the required DC or AC voltage can be generated from AC or DC input power;

iv. optimized design enabling maximum light spread in the required area;

At least one metal core Printed Circuit Board (MCPCB) mounted on the mounting surface and at least one solid state light emitting source is mounted on the said MCPCB. Optionally one or more lens mounted on one or more solid state light emitting sources for preventing the scattering of the light in unnecessary areas and thereby directing the light into desired areas. Optionally one or more protective transparent or translucent sheet covering one or more solid state light emitting sources for preventing the insects entering the lighting apparatus wherein the material of the protective transparent or translucent sheet can be selected from glass, plastic, and/or clear polycarbonate. Optionally a coated/plated layer of copper sandwiched between the primary heat sink and MCPCB, wherein such layer may further have a means for preventing corrosion. The said solid state light emitting source can be selected from the group of low power or high power LEDs including LED, OLED, PLED. One or more layers of thermal interface material (e.g. silicon rubber) placed between primary heat sink and MCPCB as well as primary heat sink and secondary heat sink and two or more secondary heat sinks.

The lighting apparatus further comprising one or more heat dissipating panels acting as secondary heat sink mounted on the front or reverse side of fixture, optionally having one or more slit, hole or fin, selectively punched on the secondary heat sink for achieving additional heat dissipation and minimizing the resistance to wind and wherein such secondary heat sink is made of at least one thermally conductive material selected from the set of aluminum, iron, steel, copper or combinations or alloys thereof. One or more layers of thermal interface material (e.g. silicon rubber) placed between primary heat sink and MCPCB as well as primary heat sink and secondary heat sink and two or more secondary heat sinks.

Further the lighting apparatus is installed with a photo sensor means and/or motion sensor means when used for public lighting purposes, a photo sensor means and/or motion sensor means coupled with AC or DC input power or power supply unit, the said photo sensor means and/or motion sensor means are configured to selectively control the power input to the solid state lighting apparatus, wherein the photo sensor means can be Day light sensor or High Accuracy Ambient Light Sensor. Further the lighting apparatus enabled to achieve ingress protection standards wherein the standards can be IP65, IP66, and IP67 or any other Ingress Protection standards issued by the European Committee for Electro Technical Standardization.

According to another embodiment of the invention, long lasting, energy efficient, solid-state lighting apparatus having customizable design, wherein the said apparatus comprises a fixture having at least one mounting surface, optionally one or more slit, hole or fin, selectively punched on the mounting surface of the fixture for achieving additional heat dissipation and minimizing the resistance to wind. The above said fixture is made of at least one thermally conductive sheet metal, wherein the thermally conductive sheet metal is selected from the set of aluminum, iron, steel, copper or combinations or alloys thereof. The fixture is manufactured by computerized numerically controlled (CNC) process; the said fixture is characterized in having;

- i. the entire body of the fixture acting as first primary heat sink, wherein the fixture is designed in a manner, such that the heat dissipation is maximum in x, y coordinates laterally of the fixture due to optimized thickness (z-axis) of the fixture maintained in the range from 0.5 to 6 mm;
- ii. anodization for preventing corrosion and scratches thereby increasing thermal conductivity;
- iii. a power supply unit enclosed in a housing of fixture, wherein the power supply unit provides required DC or AC voltage to one or more solid state light emitting sources;
- iv. optimized design enabling maximum light spread in the required area;

At least one metal core Printed Circuit Board (MCPCB) mounted on the mounting surface and at least one solid state light emitting source is mounted on the said MCPCB and the said solid state light emitting source can be selected from the group of low power or high power LEDs including LED, OLED, PLED, second primary heat sink with heat insulating sheet and/or buffer spacing is placed on the rear side of the fixture and at least one solid state light emitting source from MCPCB which is mounted on first primary heat sink is connected thermally to such heat sink by way of metallic thermal interface and isolators through cut-out opening provided in the first primary heat sink.

The fixtures of the above said apparatuses are made by using CNC Process comprising the steps of:

- a. Selecting a sheet metal, wherein the said sheet metal can be selected from set of aluminum, iron, steel, copper or combinations or alloys thereof;
- b. Inserting the sheet metal in to a CNC machine, wherein programmed instructions cause the processor in the CNC machine to enable punching of the sheet metal in accordance to the fed design of one or more fixture and
- c. Optionally bending the punched fixture at one or more places using the CNC machine.

A method for manufacturing of long lasting, energy efficient, solid-state lighting apparatus having customizable design comprising steps of:

- a. Feeding at least one design of the fixture in to a CNC machine along with a sheet metal;
- b. Punching the sheet metal as per the design to achieve one or more fixtures;
- c. Optionally Bending the punched fixtures at one or more places;
- d. Anodizing the fixture to achieve corrosion and scratch free surface;
- e. Fixing of nutsurts/inserts/rivet nuts (hardware) pneumatically in to the fixture;
- f. Mounting on the fixture at least one metal core Printed Circuit Board (MCPCB) on which at least one solid state light emitting source is already mounted; and
- g. Mounting one or more power supply unit in a housing of the fixture.

The method further comprises placing second primary heat sink with heat insulating sheet and/or buffer spacing on the rear side of the fixture and connecting thermally at least one solid state light emitting source from MCPCB which is mounted on first primary heat sink to second primary heat sink by way of metallic thermal interface and isolators through cut-out opening provided in the first primary heat sink; placing coated layer of copper between the primary heat sink and MCPCB, wherein such coated layer may further have a means for preventing corrosion; and mounting one or more heat dissipating panels (secondary heat sinks) on the front or reverse side of fixture.

Further the method having optionally mounting a photo sensor means and/or a motion sensor in front and/or rear side of the fixture; optionally mounting one or more lens on one or more solid state light emitting sources; optionally covering one or more protective transparent or translucent sheet on one or more solid state light emitting sources; and placing one layer of thermal interface material between primary heat sink and MCPCB as well as primary heat sink and secondary heat sink and between two or more secondary heat sinks.

BRIEF DESCRIPTION OF THE DRAWINGS

The foregoing summary, as well as the following detailed description of preferred embodiments, are better understood when read in conjunction with the appended drawings. For the purpose of illustrating the invention, there is shown in the drawings example constructions of the invention; however, the invention is not limited to the specific apparatuses and methods disclosed. In the drawings.

DETAILED DESCRIPTION

Figure 1:
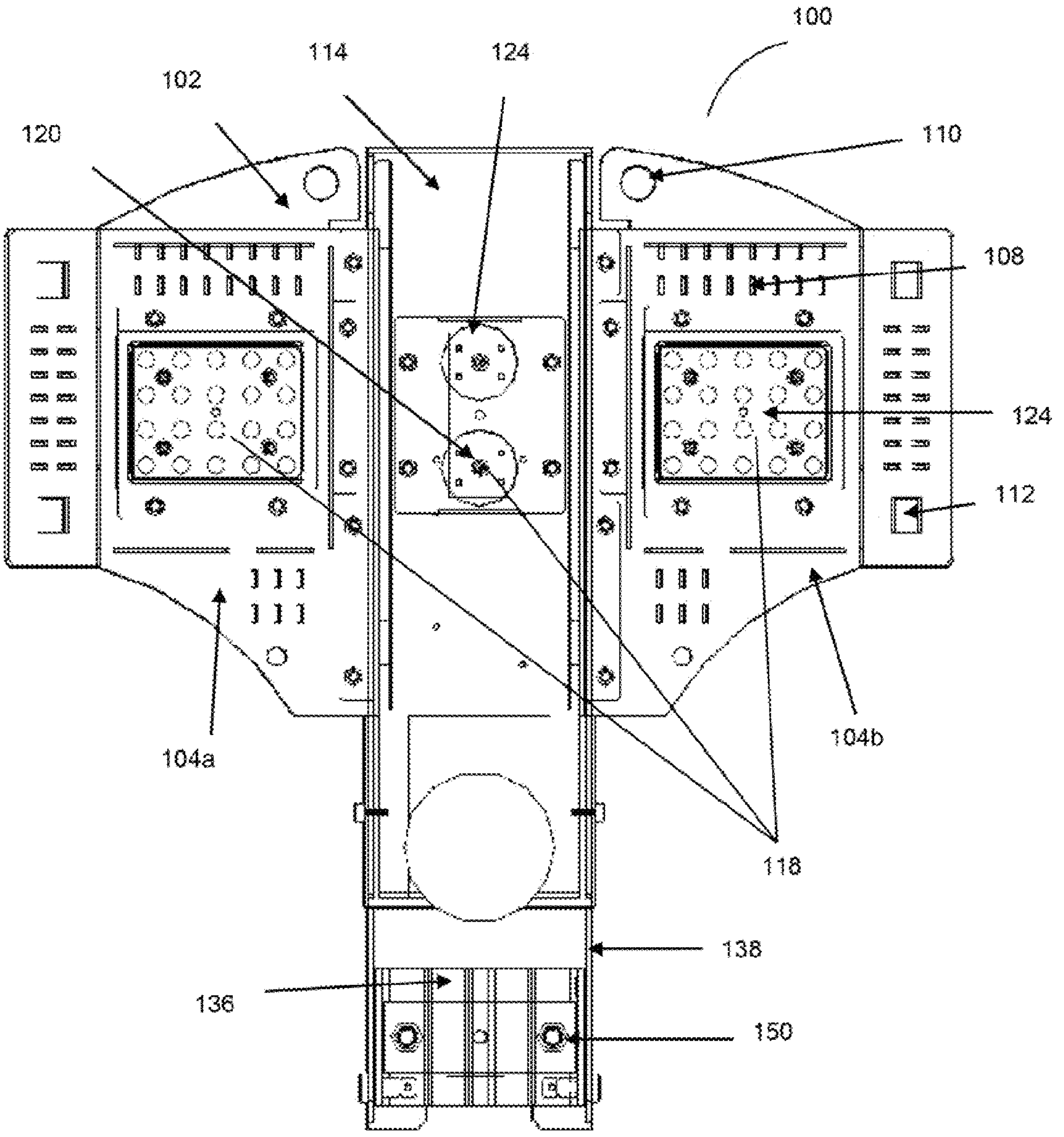
FIG. 1 illustrates a front view of solid state lighting apparatus which is used for street light application according to one exemplary embodiment of the invention.

Some embodiments of this invention, illustrating all its features, will now be discussed in detail.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any apparatuses or methods or equivalent to those described herein can be used in the practice or testing of embodiments of the present invention, the preferred apparatuses and methods are now described.

Heat Sink: A component designed to lower the temperature of the electronic/semiconductor device to which it is connected by dissipating excess heat generated at its junction point. It is often finned, and made from metals which dissipate heat faster such as aluminum, copper etc. In the current case the whole body of the fixture acts as a heat sink and heat sink is used in the form of sheet metal.

Fixtures: unless otherwise defined in this invention "fixtures" refer to a system which comprises one or more Solid State Lighting devices mounted upon the metallic frame along with the other electrical/electronic and non-electrical/electronic components.

Solid-state light emitting source (SSL): refers to a type of low power or high power lighting devices that uses light-emitting diodes (LEDs), organic light-emitting diodes (OLED), or polymer light-emitting diodes (PLED) as sources of illumination.

The present invention provides lighting solutions which are power efficient, environmental friendly and long lasting and can be custom manufactured with high degree of speed, accuracy and flexibility. The lighting fixtures of the current invention are also easily serviceable.

A long lasting, energy efficient, solid-state lighting apparatus having customizable design, wherein the said apparatus comprises:

a) a fixture having at least one mounting surface, wherein the said fixture is made of at least one thermally conductive sheet metal and is manufactured by computerized numerically controlled (CNC) process, the said fixture is characterized in having;
   i. the entire body of the fixture acting as primary heat sink, wherein the fixture is designed in a manner, such that the heat dissipation is maximum in x, y coordinates laterally of the fixture due to optimized thickness (z-axis) of the fixture maintained in the range from 0.5 to 6 mm;
   ii. anodization for preventing corrosion and scratches thereby increasing thermal conductivity;
   iii. a power supply unit enclosed in a housing of fixture, wherein the power supply unit provides required DC or AC voltage to one or more solid state light emitting sources;
   iv. optimized design enabling maximum light spread in the required area;
b) at least one metal core Printed Circuit Board (MCPCB) mounted on the mounting surface; and
c) at least one solid state light emitting source mounted on the said MCPCB.

Figure 2:
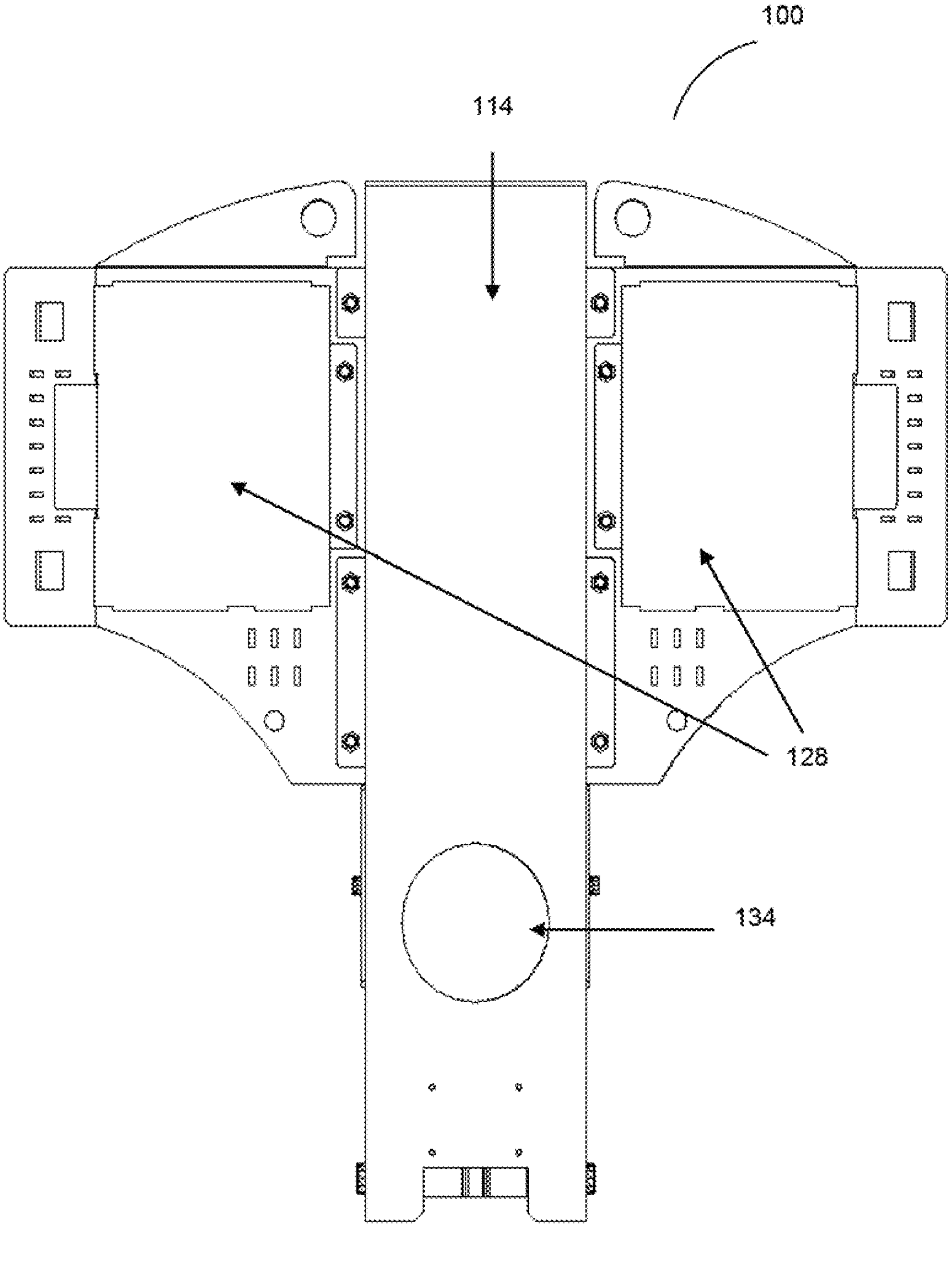
FIG. 2 illustrates a back view of solid state lighting apparatus which is used for street light application according to one exemplary embodiment of the invention.
Figure 3:
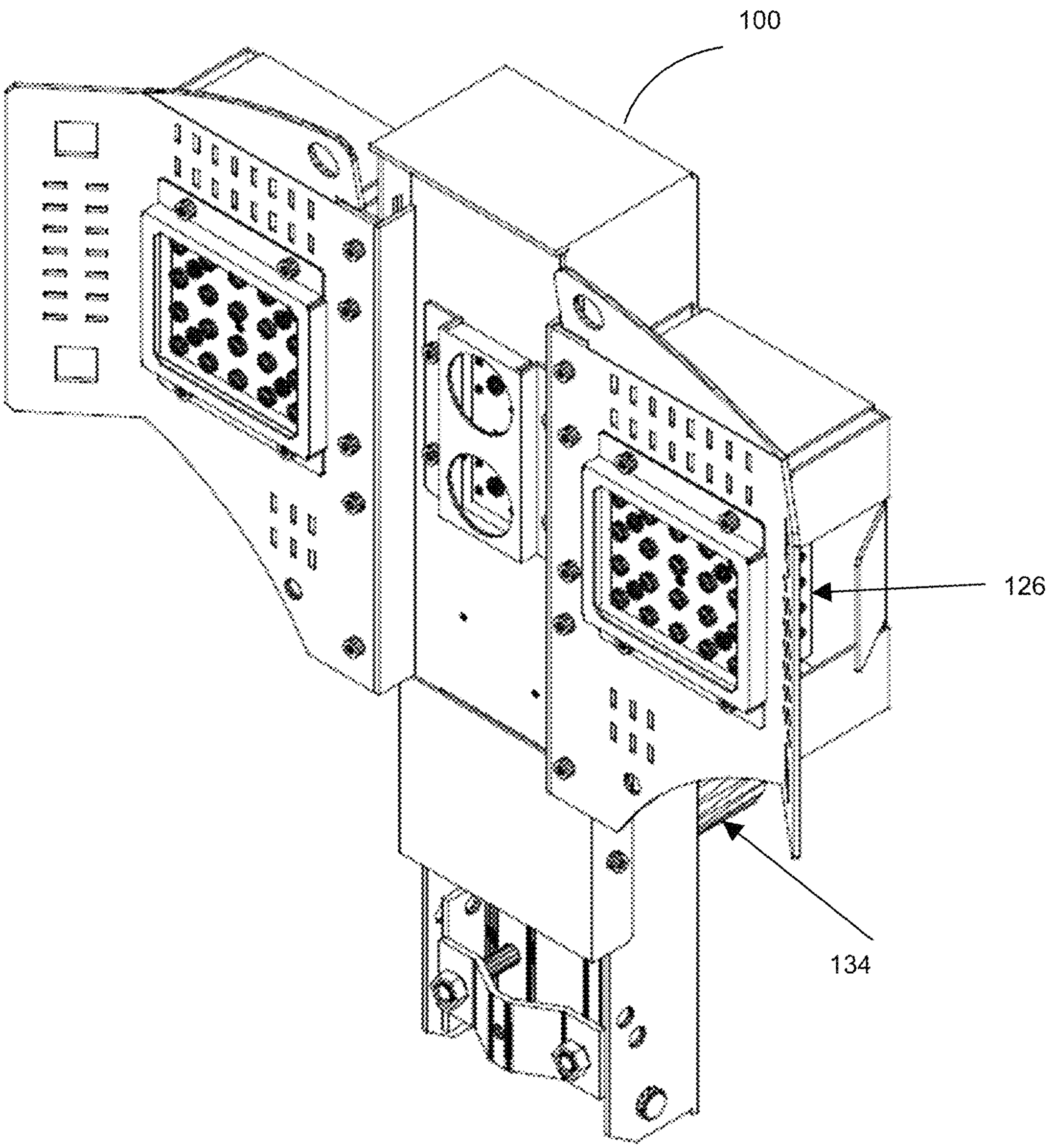
FIG. 3 illustrates an isometric front view of solid state lighting apparatus which is used for street light application according to one exemplary embodiment of the invention.

FIGS. 1, 2, and 3 illustrates a front, back and isometric front views of solid state lighting apparatus which is used for street light application according to one exemplary embodiment of the invention. A long lasting, energy efficient, solid-state lighting apparatus having customizable design, wherein the said apparatus comprises a fixture 102 having two mounting surfaces 104, namely a left side mounting surface 104*a* and a right side mounting surface 104*b*, optionally one or more slit 108, hole 110 or fin 112, selectively punched on the mounting surface 104 of the fixture 102 for achieving additional heat dissipation and minimizing the resistance to wind. The said slit 108, hole 110 or fin 112 can be any shape based on the requirements. One or more plane of the fixture 102 including the base plane of the fixture can adjustably be inclined into desired angle to achieve desired photometry; the said angle can be in the range from 0-360 degree.

The above said fixture 102 is made of at least one thermally conductive sheet metal, wherein the thermally conductive sheet metal is selected from the set of aluminum, iron, steel, copper, or combinations or alloys thereof. The said fixture 102 is manufactured by computerized numerically controlled (CNC) process; the said fixture is characterized in having;

i. the entire body of the fixture 102 acting as primary heat sink, wherein the fixture is designed in a manner, such that the heat dissipation is maximum in x, y coordinates laterally of the fixture due to thickness (z-axis) of the fixture 102 in the range from 0.5 to 6 mm;
ii. anodization for preventing corrosion and scratches thereby increasing thermal conductivity;
iii. a power supply unit 116 (not shown in the figures) enclosed in a housing 114 of fixture 102 wherein the power supply unit 116 provides required DC or AC voltage to one or more solid state light emitting sources;
iv. optimized design enabling maximum light spread in the required area;

The base plane of the fixture 102 supports each element of the solid state lighting apparatus 100. A metal core Printed Circuit Board (MCPCB) 118 mounted on the central mounting surface of the fixture 102, optionally a coated layer of copper 168 (not shown in the figures) sandwiched between the primary heat sink 102 and MCPCB 118 and Two high intensity solid state light emitting sources 120 are mounted on the MCPCB 118 and edges thereof secured thereon the central mounting surface 104 and the said solid state light emitting sources 120 can be selected from the group of low power or high power LEDs including LED, OLED, and PLED, wherein protective transparent sheet 124 or lens 122 (not shown in figures) are mounted on the high intensity solid state light emitting sources 120 for preventing the scattering of the light in unnecessary areas and thereby directing the light in to desired area.

Two MCPCBs 118 mounted on the left and right side of the mounting surfaces 104*a* and 104*b* and an array of solid state light emitting source 120 mounted on the MCPCBs 118. Two protective transparent sheets 124 are employed for covering the solid state light emitting sources 120 for preventing the insects entering the lighting apparatus, According to one embodiment of the invention, the material of the protective transparent sheet 124 can be selected from glass and/or clear polycarbonate.

The above said MCPCB 118 comprises of three layers namely bottom layer, middle (insulation) layer and top layer (not shown in the figures). The bottom layer is made up of at least one thermally conductive material selected from the set of aluminum, iron, steel, copper or combinations or alloys thereof. The bottom layer is connected with the mounting surface 104 of the fixture 102 with a thermal interface layer. The middle layer is made of electrically insulating material and used to conduct the heat from the top layer of the MCPCB 118 and not allowing conduction of electricity from the top layer to bottom layer. The top layer is made up of copper or any other metal having better heat and electrical conductivity than copper e.g. Gold plated copper. At least one solid state light emitting source 120 mounted thereon the top layer of the MCPCB 118.

Two heat dissipating panels 126 (not shown in the figures) acting as secondary heat sink are mounted (left and right side, each one respectively) thereon the reverse side of fixture 102 wherein the secondary heat sink 126 is made of at least one thermally conductive material selected from the set of aluminum, iron, steel, copper or combinations or alloys thereof. Optionally one or more slit 108, hole 110 or fin 112, selectively punched on the mounting surface 104 of the fixture 102 for achieving additional heat dissipation and minimizing the resistance to wind. The said slit 108, hole 110 or fin 112 can be any shape based on the requirements.

The secondary heat sink 126 on the top-side heat dissipating area is covered by means of a metal covering 128 affixed thereon the fixture 102 protecting the elements underneath and wherein the metal covering 128 prevents coating of upper heat dissipating area from bird droppings and any other droppings, these droppings reduces heat dissipation ability of the top side heat dissipating area of the fixture 102.

A housing 114 secured thereon the distal ends of the fixture 102. A power supply units 116 are mounted inside said housing 114, the solid state lighting apparatus 100 is easily serviceable, wherein the power supply units are independent components and can be replaced in case of failures. The power supply units 116 electrically connected to each of solid state light emitting sources 120 by means of connecting wires extending from the power supply units 116 to the solid state light emitting source 120. The said power supply unit 116 achieves a power factor >0.98 thereby reducing the reactive power. The required DC or AC voltage can be generated from AC or DC input power. The AC/DC input power supply can be converted into required DC power supply for operation of the solid state light emitting sources 120 by using AC to DC converter, or DC to DC converter as per requirement.

Further solid state lighting apparatus 100 is installed with a photo sensor means 134 and/or motion sensor means 172 (not shown in the figures) when used for public lighting purposes, a photo sensor means 134 and/or motion sensor means 172 coupled with AC or DC input power or power supply unit, the said photo sensor means 134 and motion sensor means 172 are configured to selectively control the power input to the solid state lighting apparatus 100, wherein the photo sensor means 134 can be Day light sensor or High Accuracy Ambient Light Sensor.

The motion sensor means 172 can be worked in two ways for saving the energy, one way operation based on sensing the motion wherein motion sensor means 172 is configured to control the power input to switch ON the solid state lighting apparatus 100. If there is no motion is sensed by the motion sensor means 172 thereby configured to control the power input to switch OFF the solid state lighting apparatus 100. Second way of operation is based on sensing the motion, wherein upon detection of motion the motion sensor means 172 is configured to allow 100% power input to the solid state light emitting sources 120 to improve light intensity by 100%. If there is no motion sensed by the motion sensor means 172 the power input to the solid state light emitting sources 120 is reduced to reduce the light intensity up to 90%.

According to one embodiment of the invention, solid state lighting apparatus 100 is installed with a timer 174 (not shown in the figures) coupled with AC or DC input power, the said timer means configured to selectively control the power input to the solid state lighting apparatus. The timer 174 can be worked in n number of ways to selectively control the power supply of the solid state lighting apparatus 100 for switching ON and OFF and controlling light intensity by controlling the power supplied to the apparatus 100.

An apparatus engagement means 136 with two holes in c-channel 138 providing the ability for angular adjustment to the fixture 102 so as to adjust the photometry of the light along the width of the road. Further, the said apparatus 100 enables to achieve ingress protection standards wherein the standards can be IP65, IP66, and IP67, etc.

Figure 4:
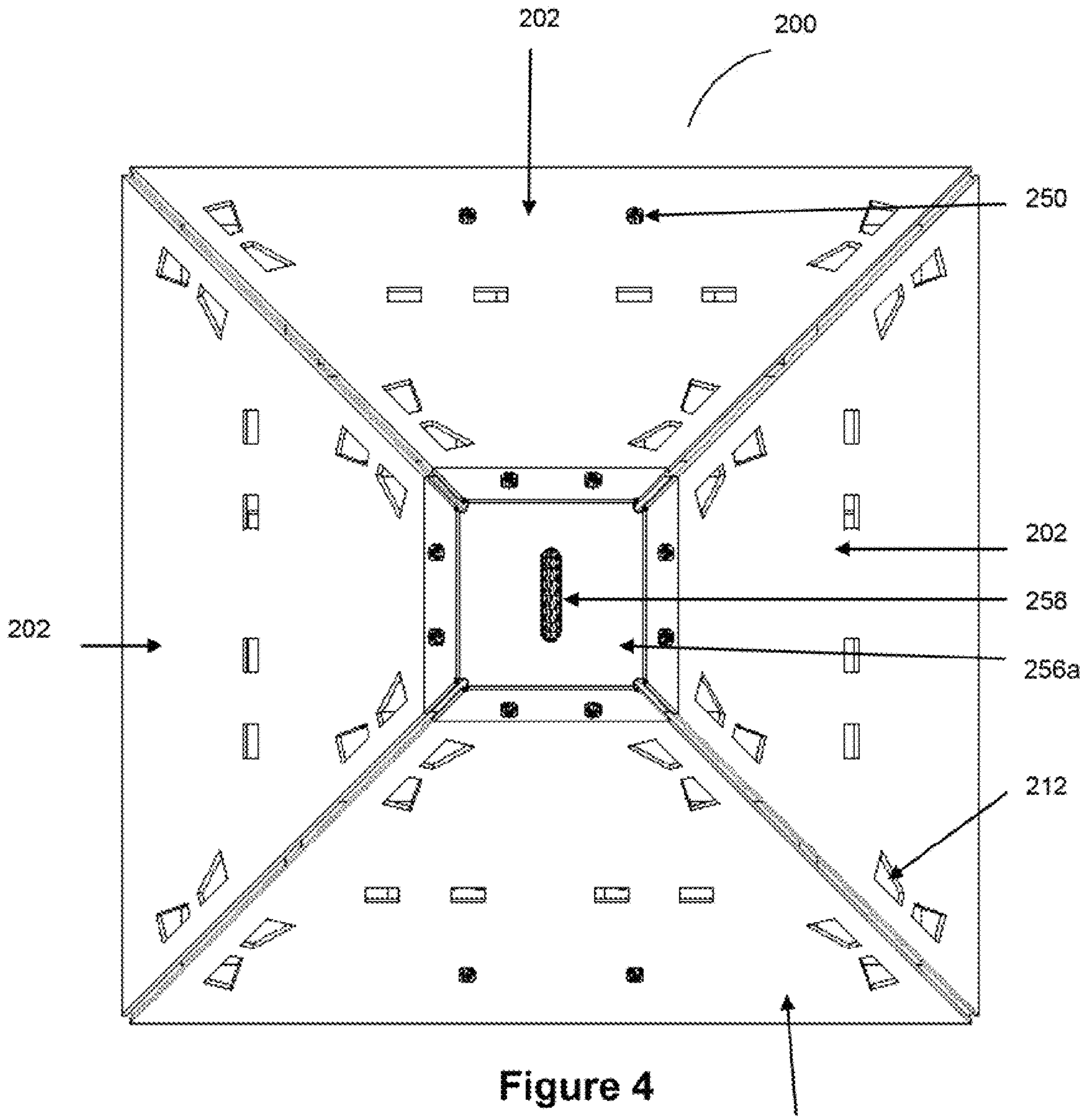
FIG. 4 illustrates a top view of solid state lighting apparatus which is used for Bay Light application according to another exemplary embodiment of the invention.

FIG. 4 illustrates a top view of solid state lighting apparatus which is used for High Bay Light application according to another exemplary embodiment of the invention. The solid state lighting apparatus 200 having five separate fixtures 202 connected to form one fixture 200 using connecting means 256*a*, 256*b* with help of the screws 250. The fixture 202 is made of at least one thermally conductive material and the thermally conductive material is selected from the set of aluminum, iron, steel, copper, or combinations or alloys thereof.

Each fixture having one or more slits 208 (not shown in figure) or fins 212, selectively punched on mounting surface 204 of the each fixture 202 for achieving additional heat dissipation and minimizing the resistance to wind. The slit 208 or fin 212 can be any shape based on the requirements.

The above said fixtures 202 is made of at least one thermally conductive sheet metal, wherein the thermally conductive sheet metal is selected from the set of aluminum, iron, steel, copper, or combinations or alloys thereof. The said fixture manufactured by computerized numerically controlled (CNC) process; the said fixture is characterized in having;

i. four separate fixtures 202 connected to form one fixture 202, thereby achieving independent heat management system for each of the four fixtures as well as the central fixture;

ii. the entire body of the fixture 202 acting as primary heat sink, wherein the fixture is designed in a manner, such that the heat dissipation is maximum in x, y coordinates laterally of the fixture due to thickness (z-axis) of the fixture 202 in the range from 0.5 to 6 mm;

iii. anodization for preventing corrosion and scratches thereby increasing thermal conductivity;

iv. optimized design enabling maximum light spread in the required area;

v. One or more plane of the fixture 202 including the base plane of the fixture can adjustably be inclined into desired angle to achieve desired photometry; the said angle can be in the range from 0-360 degrees.

vi. light spread/throw optionally will be achieved with combination of different lenses placed on the solid state light emitting sources A hook 258 is attached at the top of the fixture 202 for fixing the said lighting apparatus 200 with the required object.

Figure 5:
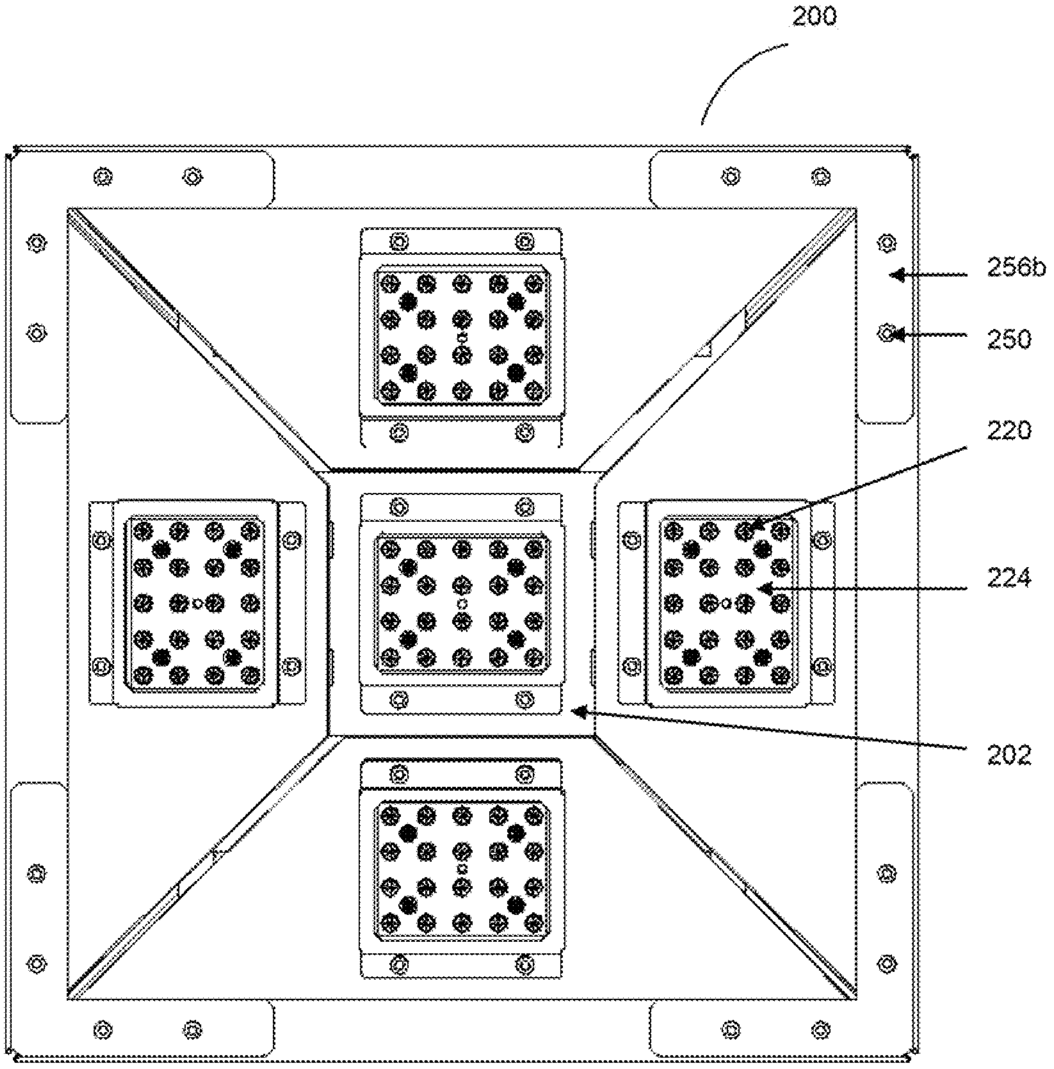
FIG. 5 illustrates a bottom view of solid state lighting apparatus which is used for Bay Light application according to another exemplary embodiment of the invention.

FIG. 5 illustrates a bottom view of solid state lighting apparatus which is used for Bay Light application according to another exemplary embodiment of the invention. Five metal core Printed Circuit Boards (MCPCB) 218 (not shown in the figure) mounted on each mounting surfaces of the five fixtures 202, optionally a coated layer of copper 268 (not shown in the figure) sandwiched between the primary heat sink 202 and MCPCB 218 and an array of solid state light emitting source 220 is mounted on the MCPCBs 218. Transparent sheets 224 are employed for covering the solid state light emitting sources 220 for preventing the insects entering the lighting apparatus, according to one embodiment of the invention, the material of the protective transparent sheet can be selected from glass and/or clear polycarbonate.

The above said MCPCB 218 comprises three layers namely bottom layer, middle (insulation) layer and top layer (not shown in the figure). The bottom layer is made up of at least one thermally conductive material selected from the set of aluminum, iron, steel, copper or combinations or alloys thereof. The bottom layer is connected with the mounting surface 204 (not shown in figure) of the fixture 202 with a thermal interface layer. The middle layer is made of electrically insulating material and used to conduct the heat from the top layer of the MCPCB 218 and not allowing conduction of electricity from the top layer to bottom layer. The top layer is made up of copper or any other metal having better heat and electrical conductivity than copper e.g. Gold plated copper. At least one solid state light emitting source 220 mounted thereon the top layer of the MCPCB 218.

Optionally five heat dissipating panels 226 (not shown in the figures) acting as secondary heat sink are mounted thereon the reverse side of fixtures 202 wherein the heat dissipating panel 226 is made of at least one thermally conductive material selected from the set of aluminum, iron, steel, copper or combinations or alloys thereof. Optionally one or more slit 208, or fin 212, selectively punched on the mounting surface 204 of the fixtures 202 for achieving additional heat dissipation and minimizing the resistance to wind. The said slit 208, or fin 212 can be any shape based on the requirements. Two layers of thermal interface material (not shown in the figures) 270 placed between primary heat sink 202 and MCPCB 218 as well as primary heat sink 202 and secondary heat sink 226 conducting the heat from primary heat sink 202 to secondary heat sink 226. The layer of thermal interface material can be silicon rubber sheet. A power supply unit 216 (not shown in figure) is mounted inside the solid state lighting apparatus 200 which is easily serviceable, wherein the power supply units are an independent component and can be replaced in case of failures.

The said power supply unit 216 achieves a power factor >0.98 thereby reducing the reactive power. The required DC or AC voltage can be generated from AC or DC input power. The AC/DC input power can be converted into DC power supply for operation of the solid state light emitting sources by using AC to DC converter, or DC to DC converter as per requirement. Further, the said apparatus 200 enables to achieve ingress protection standards wherein the standards can be IP54, IP65, IP66, and IP67, etc.

Figure 6:
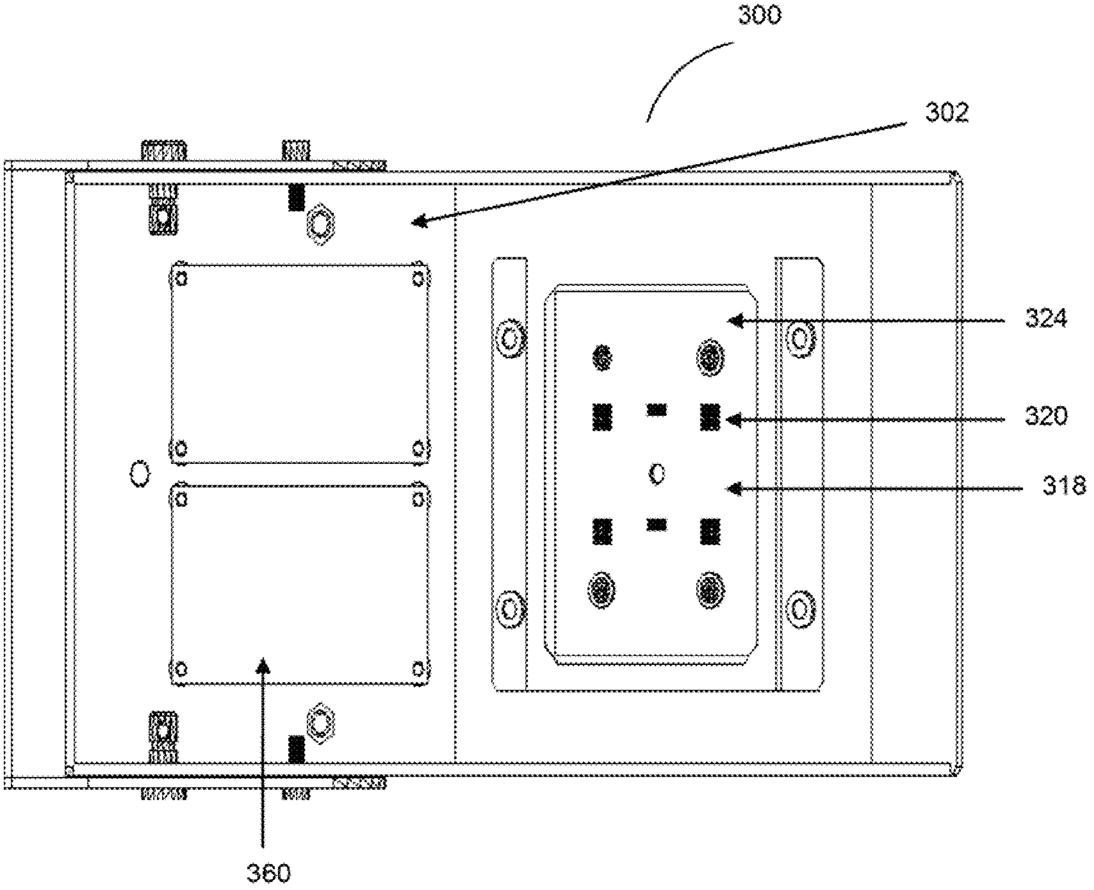
FIG. 6 illustrates a top view of solid state lighting apparatus which is used for Bay Light application according to another exemplary embodiment of the invention.

FIG. 6 illustrates a top front view of solid state lighting apparatus which is used for flood light application according to one exemplary embodiment of the invention. The solid-state lighting apparatus 300 comprises a fixture 302. One or more plane of the fixture 302 including the base plane of the fixture can adjustably be inclined into desired angle to achieve desired photometry; the said angle can be in the range from 0-360 degree. The fixture 302 comprises two power supply units 360.

The above said fixture 302 is made of at least one thermally conductive sheet metal, wherein the thermally conductive sheet metal is selected from the set of aluminum, iron, steel, copper, and combinations or alloys thereof. The fixture is manufactured by computerized numerically controlled (CNC) process; the said fixture is characterized in having;

i. the entire body of the fixture 302 acting as primary heat sink, wherein the fixture is designed in a manner, such that the heat dissipation is maximum in x, y coordinates laterally of the fixture due to thickness (z-axis) of the fixture 302 in the range from 2 to 6 mm;

ii. anodization for preventing corrosion and scratches thereby increasing thermal conductivity;

iii. one or more power supply units 360 of fixture 302 wherein the power supply units 360 provides required DC or AC voltage to one or more solid state light emitting sources;

iv. optimized design enabling maximum light spread/throw in the required area;

v. optionally light spread/throw will be achieved with combination of different lenses placed on the solid state light emitting sources 320.

The base plane of the solid state lighting apparatus 300, A metal core Printed Circuit Board (MCPCB) mounted on base plane of fixture 302 optionally a coated layer of copper 368 (not shown in the figure) sandwiched between the base plane (primary heat sink) 302 and MCPCB 318 and an array of solid state light emitting source 320 is mounted on the MCPCB 318. Protective transparent sheets 324 are employed for covering the solid state light emitting sources 320. According to one embodiment of the invention, the material of the transparent sheet can be selected from glass and/or clear polycarbonate. The solid state light emitting sources 320 used in the solid state lighting apparatus 300 can be selected from the group of high power LEDs including LED, OLED, and PLED.

The above said MCPCB 318 comprises of three layers namely bottom layer, middle (insulation) layer and top layer (not shown in the figure). The bottom layer is made up of at least one thermally conductive material is selected from the set of aluminum, iron, steel, copper or combination or alloys thereof. The bottom layer is connected with the mounting surface of the fixture. The middle layer is made of insulating material and used to conduct the heat from the top layer of the MCPCB 318 and not allowing conduction of electricity from the top layer to bottom layer. The top layer is made up of copper or any other metal having better heat and electrical conductivity than copper e.g. Gold plated copper. At least one solid state light emitting source 320 mounted thereon the top layer of the MCPCB 318.

A power supply unit 360 is mounted inside said fixture 302, the solid state lighting apparatus 300 is easily serviceable, wherein the power supply unit 360 is an independent component and can be replaced in case of failures. The fixture 302 is covered by means of a cover plate 328. The said power supply unit 360 achieves a power factor >0.98 thereby reducing the reactive power. The required DC or AC voltage can be generated from AC or DC input power. The AC/DC input power can be converted into DC power supply for operation of the solid state light emitting sources by using AC to DC converter, or DC to DC converter as per requirement.

According to one exemplary embodiment of the invention, covering plate 328 (shown in the FIG. 7) provided on top side heat dissipating area of the fixture 302 to protect it from any sort of bird droppings and/or any other droppings.

Figure 7:
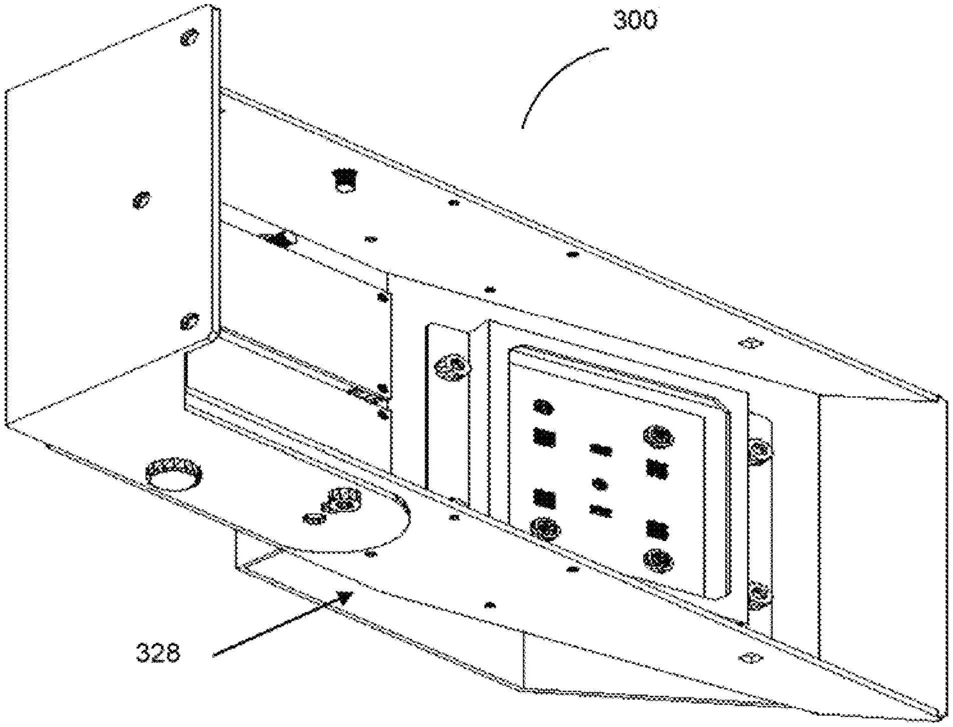
FIG. 7 illustrates an isometric front view of solid state lighting apparatus which is used for flood light application according to one exemplary embodiment of the invention.

FIG. 7 illustrates an isometric front view of solid state lighting apparatus which is used for flood light application according to one exemplary embodiment of the invention.

Figure 8:
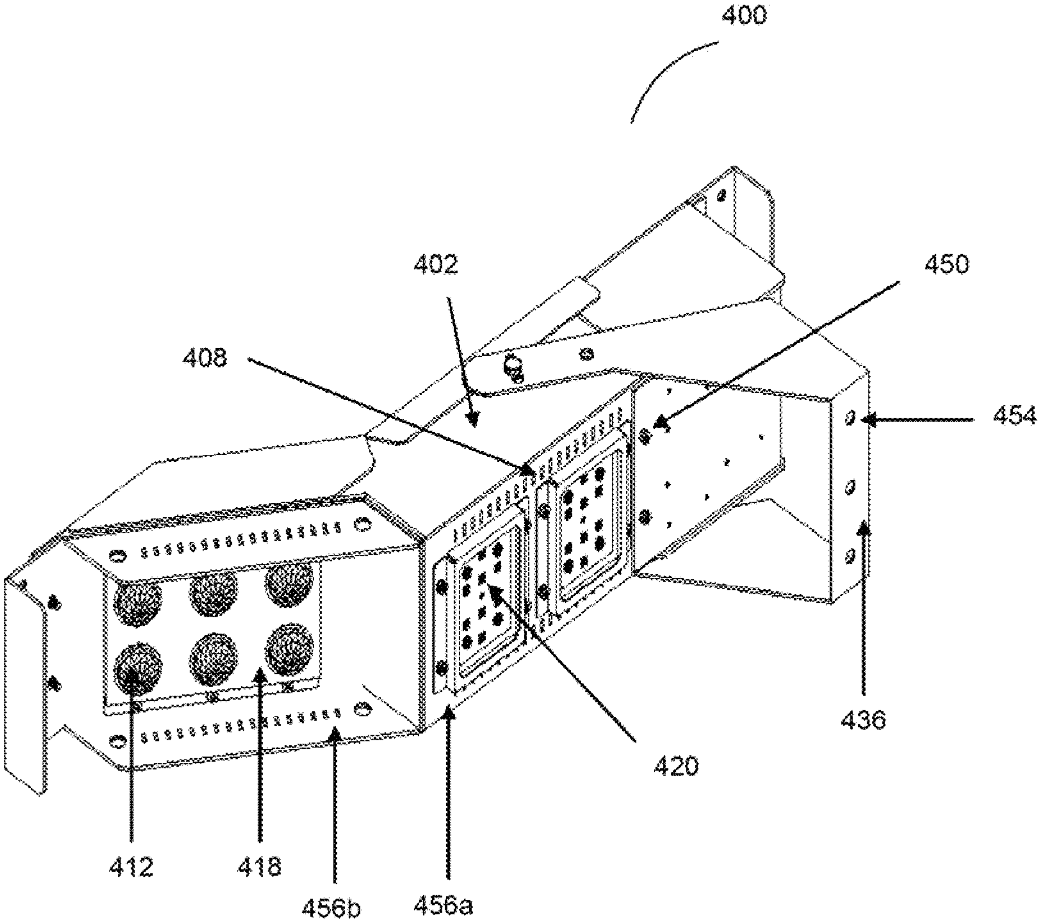
FIG. 8 illustrates an isometric front view of solid state lighting apparatus which is used for High Mast application according to another exemplary embodiment of the invention.

FIG. 8 illustrates an isometric front view of solid state lighting apparatus which is used for High Mast application according to another exemplary embodiment of the invention The solid-state lighting apparatus 400 comprises a fixture 402. Optionally one or more slits 408, selectively punched on the fixture 402 for achieving additional heat dissipation and minimizing the resistance to wind. The said slit 408 can be any shape based on the requirements. One or more plane including the base plane of the fixture 402 can adjustably be inclined into desired angle to achieve desired photometry; the said angle can be in the range from 0-360 degree.

The above said fixture 402 is made of at least one thermally conductive sheet metal, wherein the thermally conductive sheet metal is selected from the set of aluminum, iron, steel, copper, and combinations or alloys thereof. The fixture 402 is manufactured by computerized numerically controlled (CNC) process; the said fixture is characterized in having;

i. the entire body of the fixture 402 acting as primary heat sink, wherein the fixture is designed in a manner, such that the heat dissipation is maximum in x, y coordinates laterally of the fixture due to thickness (z-axis) of the fixture 402 in the range from 0.5 to 6 mm;
ii. anodization for preventing corrosion and scratches thereby increasing thermal conductivity;
iii. one or more power supply units 416 (not shown in figure) fixed inside the fixture 402 wherein the power supply units 416 provides required DC or AC voltage to one or more solid state light emitting sources;
iv. optimized design enabling maximum light spread/throw in the required area;
v. optionally light spread/throw will be achieved with combination of different lenses placed on the solid state light emitting sources 420.
vi. combination of short range light throw plane **456*a* and long range light throw plane 456*b*** will achieve desired photometry and coverage on the ground.

At least one metal core Printed Circuit Board (MCPCB) mounted on short range light throw plane **456*a* and an array of solid state light emitting source 420 is mounted on the MCPCB 418. Protective transparent sheet 424 (not shown in the figure) employed for covering the solid state light emitting sources 420. According to one embodiment of the invention, the material of the transparent sheet can be selected from glass and/or clear polycarbonate. The solid state light emitting sources 420** can be selected from the group of high power LEDs including LED, OLED, and PLED.

At least one metal core Printed Circuit Board (MCPCB) 418 mounted on long range light throw plane **456*b* and high power solid state light emitting sources 420 (not shown in the figure) are mounted on the MCPCB 418, wherein lens 422 are mounted on the high power solid state light emitting sources 420** for preventing the scattering of the light in unnecessary areas and thereby directing the light in to desired area.

The above said MCPCB 418 comprises three layers namely bottom layer, middle (insulation) layer and top layer (not shown in the figure). The bottom layer is made up of at least one thermally conductive material is selected from the set of aluminum, iron, steel, copper or combination or alloys thereof. The bottom layer is connected with the mounting surface of the fixture. The middle layer is made of insulating material and used to conduct the heat from the top layer of the MCPCB 418 and not allowing conduction of electricity from the top layer to the bottom layer. The top layer is made up of copper or any other metal having better heat and electrical conductivity than copper e.g. Gold plated copper. At least one solid state light emitting source 420 mounted thereon the top layer of the MCPCB 418.

Power supply units 416 (not shown in the figure) are mounted inside the said fixture 402, the solid state lighting apparatus 400 is easily serviceable, wherein the power supply unit 416 is an independent component and can be replaced in case of failures. The fixture 402 is covered by means of a cover plate 428 (shown in FIG. 9). The said power supply unit 416 achieves a power factor >0.98 thereby reducing the reactive power. The required DC or AC voltage can be generated from AC or DC input power. The AC/DC input power can be converted into DC power supply for operation of the solid state light emitting sources by using AC to DC converter or DC to DC converter as per the requirements.

Figure 9:
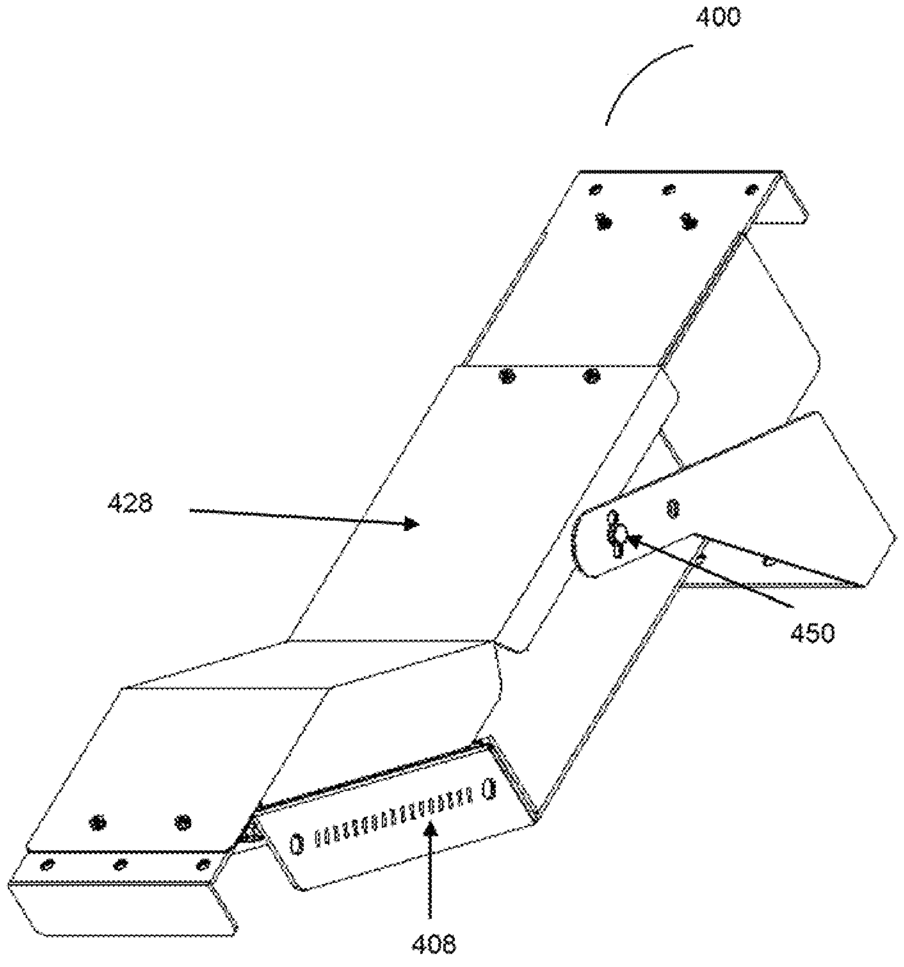
FIG. 9 illustrates an isometric back view of solid state lighting apparatus which is used for High Mast application according to another exemplary embodiment of the invention.

An apparatus engagement means 436 providing the ability for angular adjustment to the fixture 402 so as to adjust the photometry of the light on the ground, wherein the apparatus engagement means 436 is attached with fixture 402 by help of pins 450 (shown in FIG. 9). The apparatus engagement means 436 is attached with high mast pole with help of bolts via holes 454. Further, the said apparatus 400 enables to achieve ingress protection standards wherein the standards can be IP65, IP66, and IP67, etc.

FIG. 9 illustrates an isometric back view of solid state lighting apparatus which is used for High Mast application according to another exemplary embodiment of the invention. Covering plate 428 provided on top side of heat dissipating area of the fixture 402 to protect it from any sort of bird droppings and/or any other droppings which reduces heat dissipation ability of the top side heat dissipating area of the fixture 402.

Figure 10:
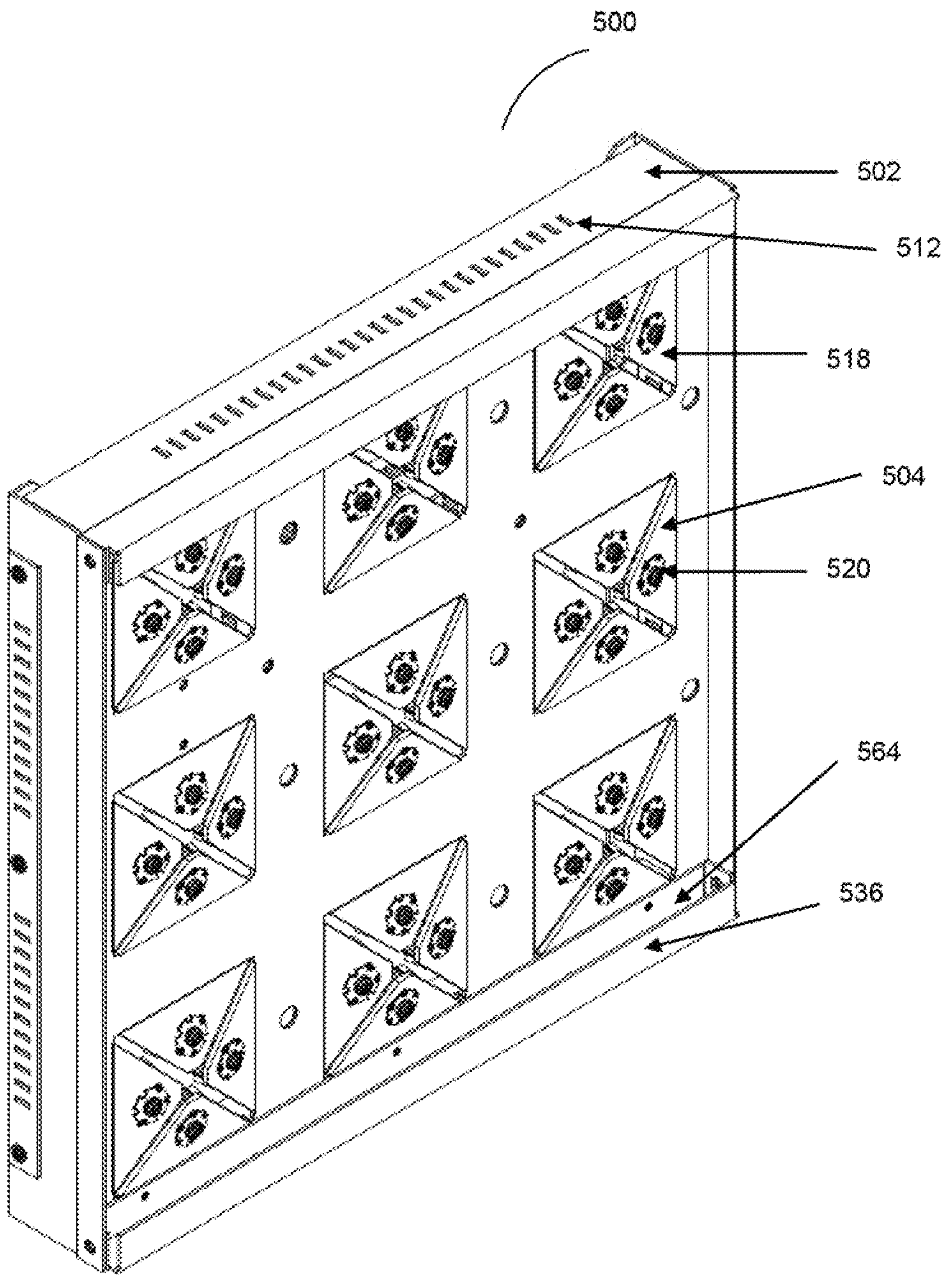
FIG. 10 illustrates an isometric front view of solid state lighting apparatus which is used for Indoor down light application according to one exemplary embodiment of the invention.

FIG. 10 illustrates an isometric front view of solid state lighting apparatus which is used for Indoor down light application according to one exemplary embodiment of the invention. A long lasting, energy efficient, solid-state lighting apparatus having customizable design, wherein the said apparatus comprises a fixture 502 having at least one mounting surface 504.

The above said fixture 502 is made of at least one thermally conductive sheet metal, wherein the thermally conductive sheet metal is selected from the set of aluminum, iron, steel, copper, or combinations or alloys thereof. The said fixture 502 is manufactured by computerized numerically controlled (CNC) process; the said fixture is characterized in having;

i. the entire body of the fixture 502 acting as primary heat sink, wherein the fixture is designed in a manner, such that the heat dissipation is maximum in x, y coordinates laterally of the fixture due to thickness (z-axis) of the fixture 502 in the range from 0.5 to 6 mm;
ii. anodization for preventing corrosion and scratches thereby increasing thermal conductivity;
iii. power supply units 516 (not shown in the figure) attached with reverse side of the fixture 502, wherein the power supply units 516 provides required DC or AC voltage to one or more solid state light emitting sources;
iv. optimized design enabling maximum light spread in the required area;
v. the mounting surfaces 504 can be bend along specified bending lines to desired inclination thereby achieving desired photometry.

The base plane of the fixture 502 supports each element of the solid state lighting apparatus 500. At least one metal core Printed Circuit Board (MCPCB) 518 mounted on the mounting surface 504 of the fixture 502 and at least one solid state light emitting sources 520 are mounted on the MCPCB 518. The said solid state light emitting sources 520 can be selected from the group of low power or high power LEDs including LED, OLED, and PLED. Independent/common protective transparent or translucent sheet 524 (not shown in figure) may be employed for covering the solid state light emitting sources 520 for preventing the insects entering the lighting apparatus. According to one embodiment of the invention, the material of the protective transparent or translucent sheet 524 can be selected from glass, clear polycarbonate or any other material.

The above said MCPCB 518 comprises three layers namely bottom layer, middle (insulation) layer and top layer (not shown in the figure). The bottom layer is made up of at least one thermally conductive material is selected from the set of aluminum, iron, steel, copper or combination or alloys thereof. The bottom layer is connected with the mounting surface of the fixture. The middle layer is made of insulating material and used to conduct the heat from the top layer of the MCPCB 518 and not allowing conduction of electricity from the top layer to the bottom layer. The top layer is made up of copper or any other metal having better heat and electrical conductivity than copper e.g. Gold plated copper. At least one solid state light emitting source 520 mounted thereon the top layer of the MCPCB 518.

A power supply unit 516 is mounted in protective box cum heat sink 528 (shown in FIG. 11) on reverse side of the fixture 502, the solid state lighting apparatus 500 is easily serviceable, wherein the power supply unit(s) 516 are an independent component and can be replaced in case of failures. The said power supply unit 516 achieves a power factor >0.98 thereby reducing the reactive power. The required DC or AC voltage can be generated from AC or DC input power. The AC/DC input power can be converted into DC power supply for operation of the solid state light emitting sources 520 by using AC to DC converter or DC to DC converter as per the requirements. Further the said apparatus 500 enables to achieve ingress protection standards of all levels.

Figure 11:
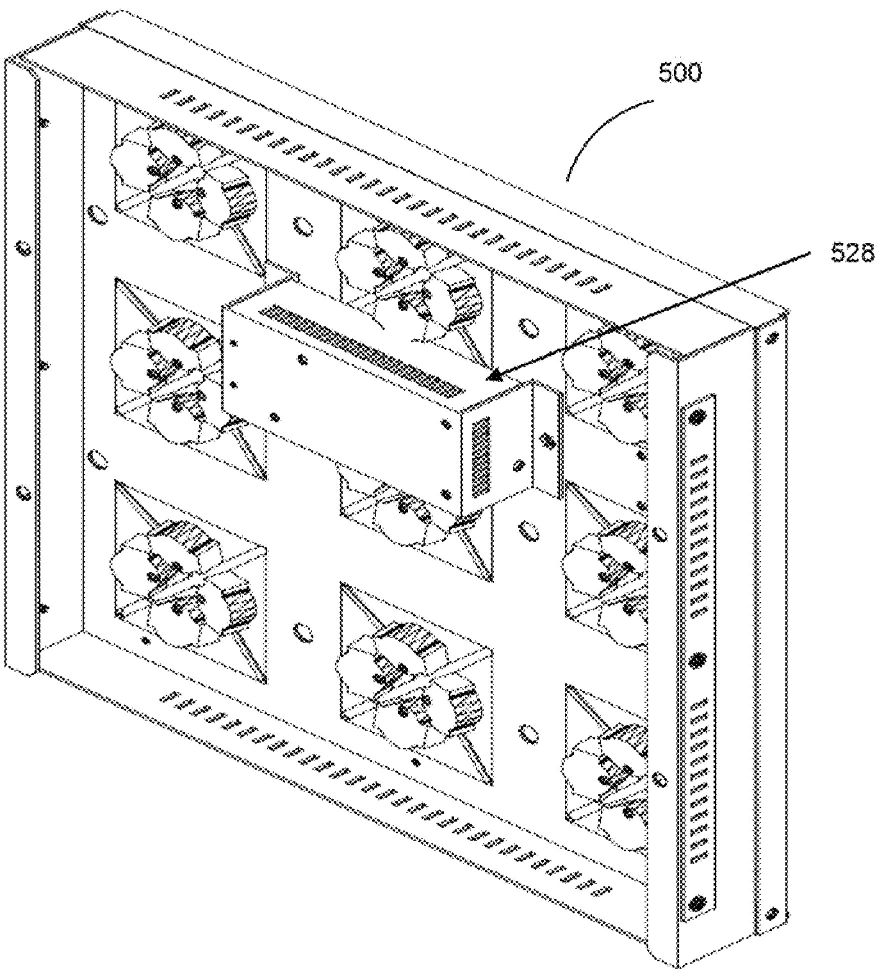
FIG. 11 illustrates an isometric back view of solid state lighting apparatus which is used for Indoor down light application according to one exemplary embodiment of the invention.

FIG. 11 illustrates an isometric back view of solid state lighting apparatus which is used for Indoor down light application according to one exemplary embodiment of the invention.

Figure 12:
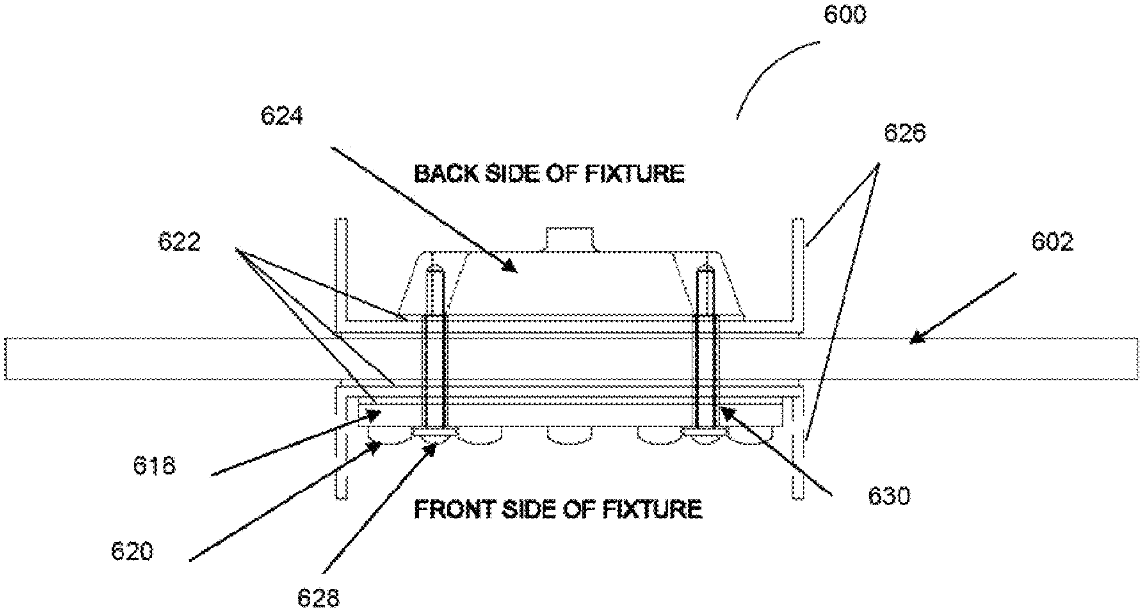
FIG. 12 shows cross sectional view of solid state lighting apparatuses with first level of heat management system according to one embodiment of the invention.

FIG. 12 shows cross sectional view of solid state lighting apparatuses with first level of heat management system according to one embodiment of the invention. A fixture acting as primary heat sink 602 has front side and back side. On the front side, the MCPCB 618 is attached using thermal interface 622 to further enhance the heat dissipation; Secondary heat sink 626 is provided exactly opposite to MCPCB 618 on the back side of the primary heat sink 602. Optionally the secondary heat sink 626 can also be mounted on front side of the primary heat sink 602 as shown in FIG. 12. As well as secondary heat sinks 626 can be put to work on the both the sides of the primary heat sink 602 simultaneously based on the requirement. Further, a well designed clamp 624 is used for clamping MCPCB 618 and secondary heat sinks 626 to the primary heat sink 602 with screws 628 and isolating bushes 630 thereby achieving desired Ingress protection. At least one solid state light emitting source 620 is mounted on the MCPCB 618.

Figure 13:
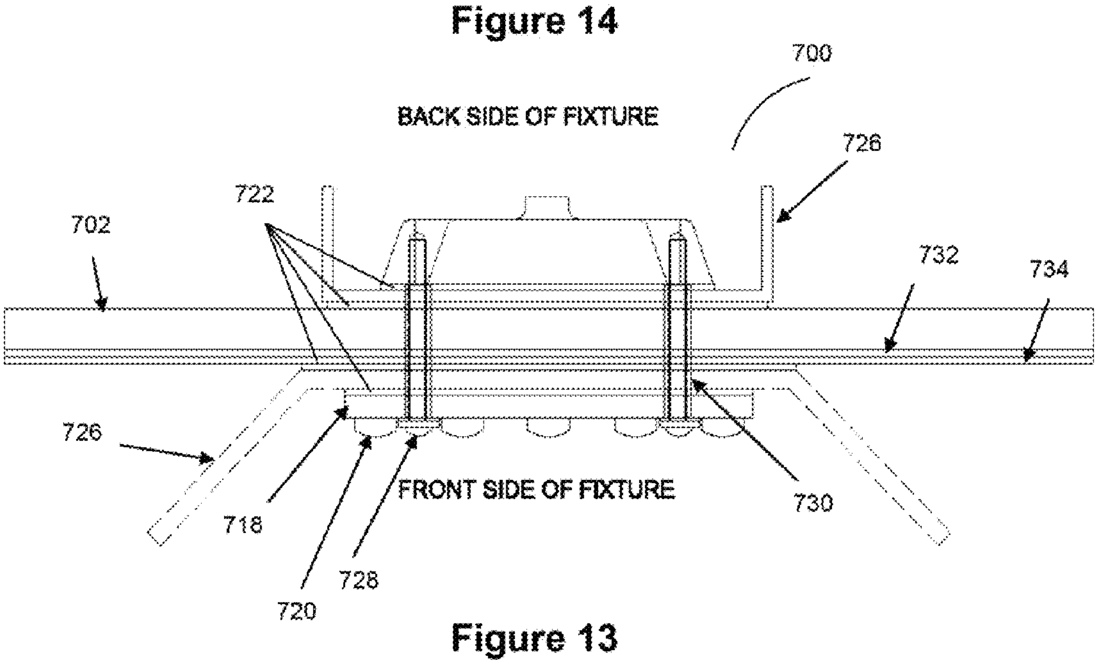
FIG. 13 shows cross sectional view of solid state lighting apparatuses with enhanced second level of heat management system according to another embodiment of the invention.

FIG. 13 shows cross sectional view of solid state lighting apparatuses with enhanced second level of heat management system according to another embodiment of the invention. A fixture acting as primary heat sink 702 has front side and back side and its front side is plated/coated with copper metal 732 or any other metal conductor having better heat conductivity than copper and this copper or any other metal is further plated/coated by suitable anti-corrosive heat conducting metal 734 (e.g. TIN plating on copper). On the front side, the MCPCB 718 is attached, using thermal interface 722. To further enhance the heat dissipation; Secondary heat sink 726 is provided exactly opposite to MCPCB 718 on the back side of the primary heat sink 702. Optionally the secondary heat sink 726 can also be mounted on front side of the primary heat sink 702 as shown in FIG. 13. Further in an embodiment the secondary heat sinks 726 can be put to work on the both the sides of the primary heat sink 702 simultaneously based on the requirement. Further, a well designed clamp 724 is used for clamping MCPCB 718 and secondary heat sinks 726 to the primary heat sink 702 with screws 728 and isolating bushes 730 thereby achieving desired Ingress protection. At least one solid state light emitting source 720 is mounted on the MCPCB 718.

Figure 14:
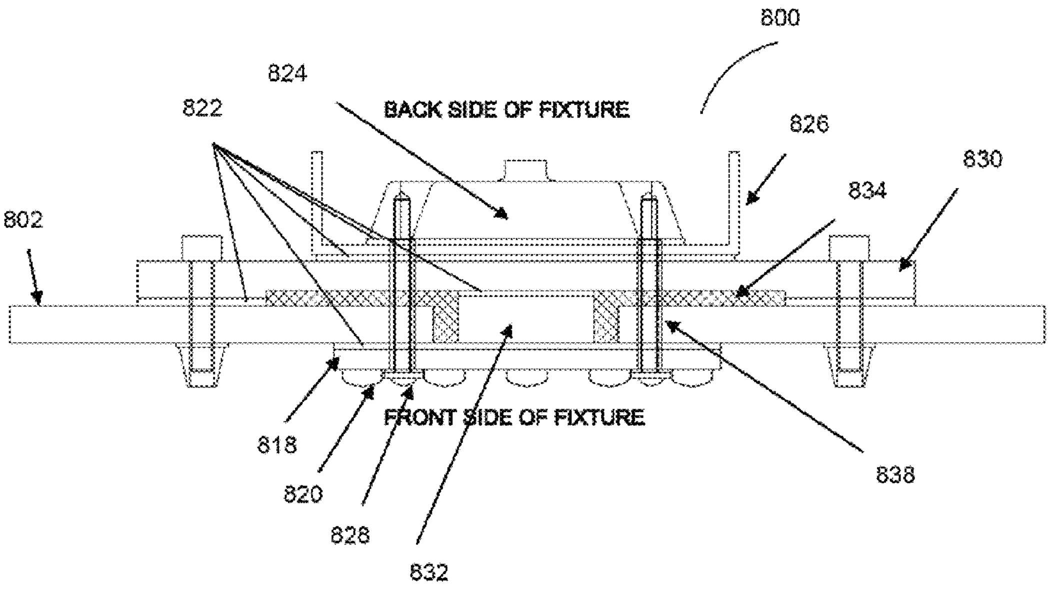
FIG. 14 shows cross sectional view of solid state lighting apparatuses with enhanced third level of heat management system according to one embodiment of the invention.

FIG. 14 shows cross sectional view of solid state lighting apparatuses with enhanced third level of heat management system according to one embodiment of the invention. According to this embodiment of the invention, concentration of large number of Light emitting sources is achieved in a smallest possible area of the fixture. A fixture acting as first primary heat sink 802 has front side and back side. On the front side the MCPCB 818 is attached using thermal interface 822, multiple numbers of solid state light emitting sources mounted on the MCPCB 818, now partially thermally isolated second primary heat sink 830 is attached to the first primary heat sink 802 through thermal interface 822. The first primary heat sink 802 on which MCPCB 818 is mounted has a cut-out opening of the suitable size in proportion with area of the MCPCB 818, so that some percentage area of the MCPCB 818 doesn't come in contact with first primary heat sink 802. One metallic thermal interface 832 is inserted in the cut-out opening of first primary heat sink 802; the said metallic thermal interface 832 connects the area of the MCPCB 818 which is not connected to first primary heat sink 802 to second primary heat sink 830 via thermal interface 822, the said metallic thermal interface 832 is thermally isolated from the first primary heat sink 802 thereby achieving diversion of certain percentage of heat to second primary heat sink 830 from the MCPCB 818 thereby aim of concentrating solid state light emitting sources 820 in a smallest possible area without concentration of the heat in the said area is achieved.

Secondary heat sink 826 is provided exactly opposite to MCPCB 818 on the back side of the second primary heat sink 830 using thermal interface 822. Further, a well designed clamp 824 is used for clamping MCPCB 818 and secondary heat sinks 826 to the first and second primary heat sinks 802 and 830 respectively with screws 828 and isolating bushes 830 thereby achieving desired Ingress protection.

Figure 15:
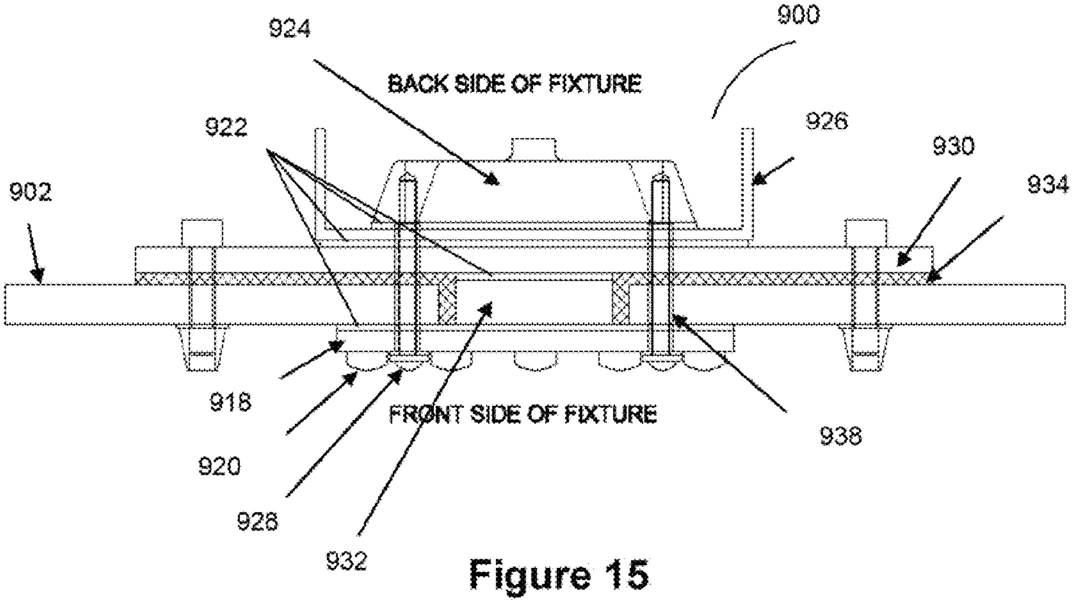
FIG. 15 shows cross sectional view of solid state lighting apparatuses with enhanced fourth level of heat management system according to another embodiment of the invention.

FIG. 15 shows cross sectional view of solid state lighting apparatuses with enhanced fourth level of heat management system according to another embodiment of the invention. According to this embodiment of the invention, concentration of large number of Light emitting sources is achieved in a smallest possible area of the fixture. A fixture acting as first primary heat sink 902 has front side and back side. On the front side the MCPCB 918 is attached using thermal interface 922, multiple numbers of solid state light emitting sources mounted on the MCPCB 918, now fully thermally isolated second primary heat sink 930 is attached to the first primary heat sink 902 through thermal isolators 934 and/or buffer space. The first primary heat sink 902 on which MCPCB 918 is mounted has a cut-out opening of the suitable size in proportion with area of the MCPCB 918, so that some percentage area of the MCPCB 918 doesn't come in contact with first primary heat sink 902. One metallic thermal interface 932 is inserted in the cut-out opening of first primary heat sink 902; the said metallic thermal interface 932 connects the area of the MCPCB 918 which is not connected to first primary heat sink 902 to second primary heat sink 930 via thermal interface 922, the said metallic thermal interface 932 is thermally isolated from the first primary heat sink 902 thereby achieving diversion of certain percentage of heat to second primary heat sink 930 from the MCPCB 918 thereby aim of concentrating solid state light emitting sources 920 in a smallest possible area without concentration of the heat in the said area is achieved.

Secondary heat sink 926 is provided exactly opposite to MCPCB 918 on the back side of the second primary heat sink 930 using thermal interface 922. Further, a well designed clamp 924 is used for clamping MCPCB 918 and secondary heat sinks 926 to the first and second primary heat sinks 902 and 930 respectively with screws 928 and isolating bushes 938 thereby achieving desired Ingress protection.

In one embodiment, the fixtures for mounting solid state light emitting sources of our invention are manufactured by computerized numerically controlled process (CNC). CNC process provides accuracy to the design of the fixtures and consumes less time and power. Moreover the CNC process enables fabricators to greatly increase the productivity and to adapt change in fixture designs very quickly thereby giving rise to customized lighting fixtures. This CNC process gives rise to high level of productivity thereby making the product affordable to larger sections of society in a short time, helping to enable us in combating the Global warming threats in a shorter span of time.

CNC machine utilizes an AC servo motor to drive the ram (eliminating the hydraulic power supply and chiller). The benefits of the CNC process are the following:

a) Electrical consumption is less than one-half of comparable hydraulic machines
b) Higher positioning speed improves productivity
c) Space-saving design saves the cost of valuable floor space
d) offers significantly faster punching speeds than mechanical turrets
e) Brush table design provides scratch-free processing, and also minimizes noise during punching
f) Free-standing, PC-based network CNC Control allows for flexible layouts
g) instantly access part programs, multi-media help files and production schedules
h) Power vacuum slug pull system virtually eliminates slug pull concerns Our invention utilizes CNC process as a core production process for the production of complete body of thermally efficient fixtures wherein the thickness of the fixtures is optimized to achieve maximum thermal conductivity.

One of the major advantages that can be achieved by using the CNC process is that one eliminates the investment required in making the dies (required for die casting of the components). In order to produce variety of components which are a part of fixtures, creation of various die-casts is required in the existing processes and the quantum of monetary investment in the same becomes unreasonable.

In one of the preferred embodiment solid state lighting apparatuses of our invention are made by CNC process which gives a degree of flexibility to adapt the design according to the requirements without any unnecessary investment in the creation of casting moulds and dies for extrusion. High degree of customization is possible.

Another benefit of the CNC process is that it utilizes in some cases almost 100% of the sheet metal (raw material) which is fed in to the CNC machine. So the scrap which comes out is least, and can be recycled, unlike the scrap of a casting process which is difficult to recycle.

In another embodiment the thickness of the sheet metal which is fed in to the CNC machine to prepare lighting fixtures are optimized to achieve maximum possible thermal conductivity.

The fixtures of the above said apparatuses are made by using CNC Process comprising the steps of:

a. Selecting a sheet metal, wherein the said sheet metal can be selected from set of aluminum, iron, steel, copper or combinations or alloys thereof;
b. Inserting the sheet metal in to a CNC machine, wherein programmed instructions cause the processor in the CNC machine to enable punching of the sheet metal in accordance to the fed design of one or more fixture and
c. Optionally bending the punched fixture at one or more places using the CNC machine.

A method for manufacturing of long lasting, energy efficient, solid-state lighting apparatus having customizable design comprising steps of:

a. Feeding at least one design of the fixture in to a CNC machine along with a sheet metal;
b. Punching the sheet metal as per the design to achieve one or more fixtures;
c. Optionally Bending the punched fixtures at one or more places;
d. Anodizing the fixture to achieve corrosion and scratch free surface;
e. Fixing of nutsurts/inserts/rivet nuts (hardware) pneumatically in to the fixture;
f. Mounting on the fixture at least one metal core Printed Circuit Board (MCPCB) on which at least one solid state light emitting source is already mounted; and
g. Mounting one or more power supply unit in a housing of the fixture.

The method further comprises placing second primary heat sink with heat insulating sheet and/or buffer spacing on the rear side of the fixture and connecting thermally at least one solid state light emitting source from MCPCB which is mounted on first primary heat sink to second primary heat sink by way of metallic thermal interface and isolators through cut-out opening provided in the first primary heat sink; optionally placing coated layer of copper between the primary heat sink and MCPCB, wherein such coated layer may further have a means for preventing corrosion; and mounting one or more heat dissipating panels (secondary heat sinks) on the front or reverse or both side of fixture.

Further method having optionally mounting a photo sensor means and/or a motion sensor rear/front side of the fixture; optionally mounting one or more lens on one or more solid state light emitting sources; optionally covering one or more protective transparent or translucent sheet on one or more solid state light emitting sources and optionally placing one or more layers of thermal interface material between primary heat sink and MCPCB as well as primary heat sink and secondary heat sink and two or more secondary heat sinks.

TEST RESULTS AND EXPERIMENTAL DATA

Features and advantages of the solid state lighting apparatus which is used for street light application according to one exemplary embodiment of the invention are as mentioned below:

a. Helps Conserve Electricity.
b. High Input Power Factor (>0.98) eliminates electrical Losses.
c. Low Harmonic Distortion (THD<15%) eliminates the cable heating.
d. High Color Rendering Index (CRI≥0.80) allows a clear visual identification, increases night security and also guarantees better video images from security camera systems.
e. Long Life more than 50,000 Hours.
f. Low Heat Emission and Ultra Low Carbon Foot Print
g. 99% of the material used is recycled
h. No Light Pollution as LED can be precisely directed for specific application.
i. Reduces maintenance cost as LED wavelength repels insects.
j. Instant ON/OFF.
k. Twist lock photo cell/Day light sensor for auto ON/OFF and
l. Extra spread with strong Centre Focus.

Example 1

Technical specifications of the solid state lighting apparatuses which are used for street light applications are as mentioned below:

| MODELS | SL 001A 032 AL | SL 001B 036 AL | SL 001C 040 AL | SL 001D 48 AL |
|---|---|---|---|---|
| Parameters | | | | |
| Input Voltage | | 85-265 VAC | | |
| Frequency Range | | 47-63 Hz | | |
| Power Factor | | >0.98 | | |
| Total Harmonic Distortion (THD) | | <15% | | |
| Power Efficiency | | 85% | | |

-continued

| MODELS | SL 001A 032 AL | SL 001B 036 AL | SL 001C 040 AL | SL 001D 48 AL |
|---|---|---|---|---|
| LED Consumption | 32 W | 36 W | 40 W | 48 W |
| Total Power Consumption | 37 W | 42 W | 46 W | 56 W |
| LED Luminous Efficiency | | 112 lm/w to 130 lm/w | | |
| Color Temperature (CCT) | | Ultra White: 6500 K | | |
| Color Index (CRI) | | 0.8 | | |
| Light Source | | 1 Watt LED | | |
| The Maximum Light Intensity angle | | 120 degree Horizontal Axis; 70 degree Vertical Axis | | |
| Junction Temperature (Tj) | | 60° C. ± 10% (Ta = 25° C.)/140° F. ± 10% (Ta = 77° F.) | | |
| Working Temperature | | −40° C. to ± 55° C./−40° F. to ± 131° F. | | |
| Working Humidity | | 10%-90% RH | | |
| Working Life | | >50,000 Hrs | | |
| Lamp Housing Material | | Aluminum | | |
| Dimensions (mm) | 435(L) × 453(W) × 84(H) | 435(L) × 453(W) × 84(H) | 435(L) × 453(W) × 84(H) | 435(L) × 453(W) × 84(H) |
| Net Weight | 4.5 Kg | 4.5 Kg | 5.5 Kg | 5.5 Kg |
| IP Rating | | IP 65/IP 66/IP 67 | | |

Features and advantages of the solid state lighting apparatuses which are used for Bay Light applications and flood light applications are differ from the street light application by not having twist lock photo cell for auto ON/OFF and they are having all other features and advantages of the solid state lighting apparatuses which are used for street light applications. Below is the table shows the comparison between High Pressure Sodium Lamp (HPS) and the solid state lighting apparatus which are used for street light applications of the our invention:

| Item | High Pressure Sodium Lamp | LED Streetlight |
|---|---|---|
| Photometric Performance | Poor: Being a round Lamp, ⅔ of lumens Generated falls on the ground through Reflector causing lower lux. Also lower color Temp. Results in poor visibility and dark spots between two poles. | Excellent engineering backed by efficient LED drivers ensures even spreading of light and center focus. Photometric performance is excellent. |
| Radiator Performance | Poor: HPS Lamp creates heat in excess of 572 F. The color spectrum of HPS creates ultraviolet/infrared rays. | Excellent, (The LED color spectrum does not radiate ultraviolet light, no infrared rays, no heat, and no radiation produced.) |
| Electrical Performance | Poor: High Losses, Low Power Factor, High Distortion | Excellent: High Power Factor eliminates losses, Low Distortion avoids heating in cables |
| Working life | Short (<5,000 hrs) | Very high (>50,000 hrs) |
| Working voltage Range | Narrow (±7%) | Wide (±45%) |
| Power Consumption | Very High | Very Low (80 to 90% power saving) |
| Startup Speed | Quite Slow (Over 10 minutes) | Instant |
| Strobe (Power Supply) | Alternating Current Drive | Direct current Drive |
| Optical Efficiency | Low (<60%) | High (>90%) |
| Color Index/Distinguish Features | Poor, Ra < 35 (The color of object looks faded, Boring and poor) | Good, Ra > 80 (The color of object is Fresh, clearly identifiable And Cool effect) |

-continued

| Item | High Pressure Sodium Lamp | LED Streetlight |
|---|---|---|
| Color Temperature | Quite Low (Yellow or Amber, dull feeling) 2000 K | Ideal Color Temperature between 5500 to 6500 K cool white |
| Glare | Strong Glare | No Glare (cool and comfortable) |
| Light Pollution | High Pollution | Non polluting |
| Heat Generation | Very High (>572° F.) | Cool light source (<140° F.) |
| Lampshade Turns Dark | High Dust Absorption easily changes color of Lampshade | Static Proof does not accumulate dust. Lamp remains fresh |
| Lampshade Aging Turns Yellow | Very fast | No lampshade required |
| Shockproof Performance | Lead/Gas pollution | Non polluting |
| Maintenance Costs | Very High, frequent replacement of Lamp, rectifier circuit and cleaning/ removing of dead insects from Lampshade | Very Low, LED life >50,000 hrs. LED light spectrum repels insects, light lamp looks always neat and clean. |
| Product Cubage | Very large | Small (Slim Appearance) |
| Cost-effective | High maintenance and High Power consumption makes HPS an expensive proposal over 10 years of usage. | Very Low maintenance and very Low power consumption makes LED an excellent cost effective lighting solutions |
| Conversion to Solar Street Light | Not Possible | Easily Possible |
| Integrated Performance | Poor | Excellent |

Example 2

Below is the table shows the cost analysis and energy saving comparison between High Pressure Sodium Lamp (HPS) and the solid state lighting apparatus which are used for street light application of the our invention:

HPS Street Light of 250 Watt Vs. Solid State Street Light of 68 Watt.

| Lamp Source/Item | | HPSV Streetlight | LED Streetlight | Remark |
|---|---|---|---|---|
| Light Source (Watt) | | 250 | 68 | |
| Power Consumption | Lamp Power Consumption (a) (Watt) | 250 | 76.16 | |
| | Electrical Distribution (b) (Watt) | Rectifier 0 | SMPS based switching power 11.424 | |
| | Comprehensive Cable Loss (6%) (c) (Watt) | 15 | 4.5696 | International standard: 5% |
| | Transformer loss (3%) (d) (Watt) | 7.5 | 2.2848 | The lowest level for 100 KVA transformer is 3% |
| | Reactive Power Compensation (e)(P.F.) | 0.7 | 0.997 | |
| | Subtotal Lamp's Power Consumption (f) (Watt) | 389.286 (a + b + c + d)/(e) = f | 94.72 (a + b + c + d)/(e) = f | |
| | Daily Consumption (Kwh) | 4.67 | 1.137 | 12 (= f/1000 × above) Calculated by per day use in hrs. |
| | 10 Years Consumption (Subtotal) (Kwh) | 17050.71429 | 4148.848465 | |
| | 10 Years Saving In Power Consumption (Kwh) | — | 12901.86582 | |
| | Percentage of Energy Saving | | 75.67 | |

*SAVINGS IN MAINTENANCE IS NOT CONSIDERED,

*EARNING THROUGH CARBON CREDIT IS NOT CONSIDERED.

Example 3

HPS Street Light of 150 Watt Vs. Solid State Street Light of 48 Watt

| Lamp Source/Item | | HPSV Streetlight | LED Streetlight | Remark |
|---|---|---|---|---|
| Light Source (Watt) | | 150 | 48 | |
| Power Consumption | Lamp Power Consumption (a) (Watt) | 150 | 53.76 | |
| | Electrical Distribution (b) (Watt) | Rectifier<br>0 | SMPS based switching power<br>8.064 | |
| | Comprehensive Cable Loss (6%) (c) (Watt) | 9 | 3.2256 | International standard: 5% |
| | Transformer loss (3%) (d) (Watt) | 4.5 | 1.6128 | The lowest level for 100 KVA transformer is 3% |
| | Reactive Power Compensation (e)(P.F.) | 0.7 | 0.997 | |
| | Subtotal Lamp's Power Consumption (f) (Watt) | 233.571<br>(a + b + c + d)/(e) = f | 66.86<br>(a + b + c + d)/(e) = f | |
| | Daily Consumption (Kwh) | 2.80 | 0.802 | 12<br>(= f/1000 × above)<br>Calculated by per day use in hrs. |
| | 10 Years Consumption (Subtotal) (Kwh) | 17050.71429 | 2928.598917 | |
| | 10 Years Saving In Power Consumption (Kwh) | — | 7301.829655 | |
| | Percentage of Energy Saving | | 71.37 | |

*SAVINGS IN MAINTENANCE IS NOT CONSIDERED,
*EARNING THROUGH CARBON CREDIT IS NOT CONSIDERED.

Example 4

The results of experiments conducted regarding the Flux distribution in upward and downward directions are as mentioned below Materials and Methods:

Catalog Number: 68 WATT LED STREET LIGHT

Luminaire: Formed and machined aluminum housing, clear glass enclosures.

Lamp: 62 White LEDs—60 with clear plastic optics and 2 with clear glass optics below LED Power Supply; ONE SSL/DR/01/80 W Electrical Values: 120.0VAC, 0.7302 A, 87.53 W, PF=0.999

Luminaire efficacy: 64.3 Lumens/Watt

Note: This test was performed using the calibrated photodector method of absolute photometry*

*Data was acquired using the calibrated photodetector method of absolute photometry. A UDT model #211 photodetector and udt model #S370 optometer combination were used as a standard. A spectral mismatch correction factor was employed based on the spectral responsivity of the photodetector and the spectral power distribution of the test subject.

Flux Distribution

| Lumens | Downward | Upward | Totals |
|---|---|---|---|
| House Side | 2397.72 | 0.01 | 2397.73 |
| Street Side | 3218.86 | 15.85 | 3234.71 |
| Totals | 5616.58 | 15.86 | 5632.44 |

Example 5

Luminaire Testing Specification and Report

Catalog Number: 68 W LED Street Light

Luminaire: Extruded and machined aluminum housing, clear glass enclosures.

Lamp: 62 White LEDs—60 with clear plastic optics and 2 with clear glass optics.

LED Power Supply: One SSL/DR/01/80 W

Luminaire Efficacy: 66.0 Lumens/Watt

Figure 16:
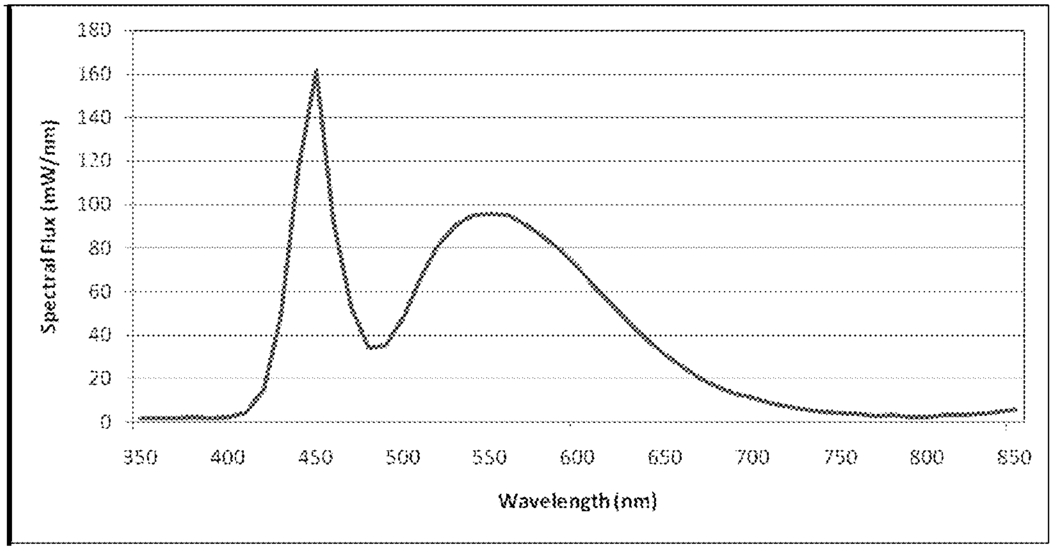
FIG. 16 shows optical and electrical experimental data as per IES LM 79-08 of the solid state lighting fixtures.
Figure 17:
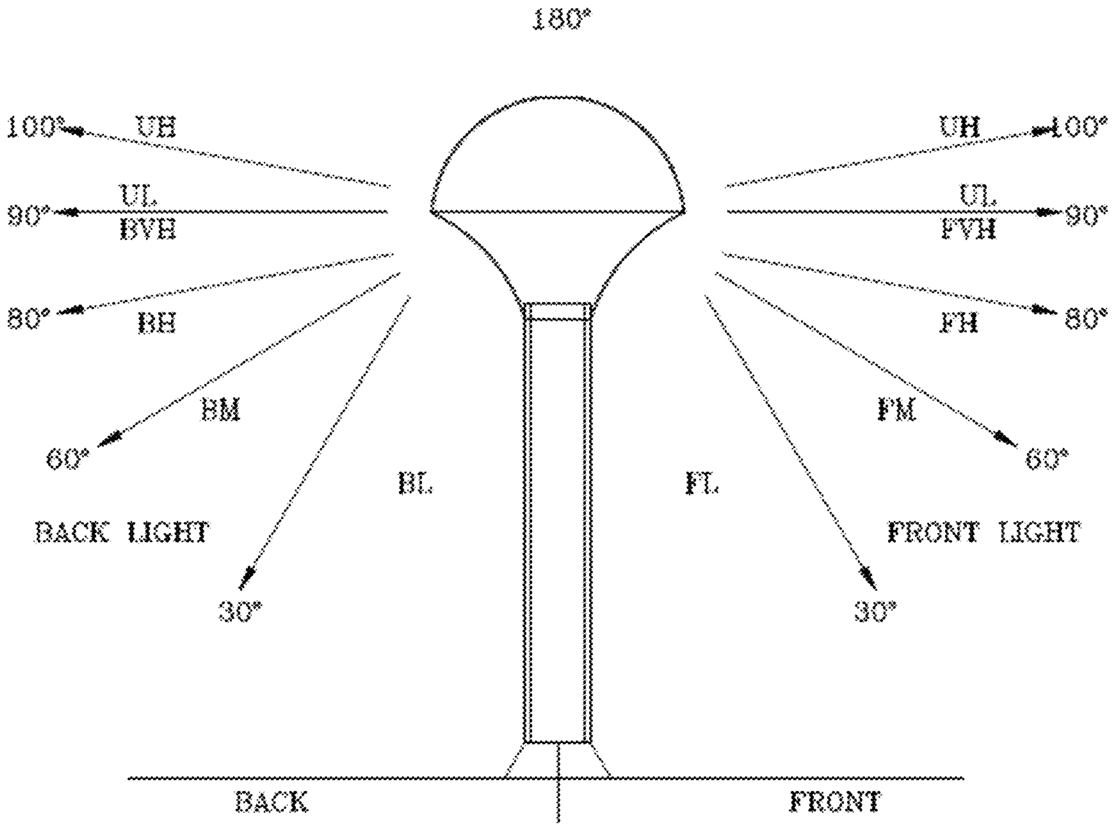
FIG. 17 shows flux distribution diagram of the solid state lighting apparatus based on the IESNA luminaire classification system.

The other details are illustrated in FIGS. 16 and 17

| ZONE | LUMINAIRE LUMENS | LUMINAIRE LUMENS |
|---|---|---|
| FORWARD LIGHT | 3219 | 57.1 |
| FL (0°-30°) | 773 | 13.7 |
| FM (30°-60°) | 1647 | 29.2 |
| FH (60°-80°) | 688 | 12.2 |
| FVH (80°-90°) | 111 | 2.0 |
| BACK LIGHT | 2398 | 42.6 |
| BL (0°-30°) | 847 | 15.0 |
| BM (30°-60°) | 1217 | 21.6 |
| BH (60°-80°) | 326 | 5.8 |
| BVH (80°-90°) | 9 | 0.2 |
| UPLIGHT | 16 | 0.3 |
| UL (90°-100°) | 16 | 0.3 |
| UH (100°-180°) | 0 | 0.0 |
| TRAPPED LIGHT | NA | NA |

Example 6A

Another experiment conducted shows comparison of Luminous efficiency of a 20 W LED lighting device with tube lights of 40 W at different angles.

| | Fitting of street lights of 20 W LED | | | Fitting of tube lights of 40 W | | |
|---|---|---|---|---|---|---|
| Angle | 3 m distance | 6 m distance | 10 m distance | 3 m distance | 6 m distance | 10 m distance |
| Straight Connection | 14 lux | 7 lux | 3 lux | 6 lux | 3 lux | 1 lux |
| 45 Deg fitting | 11 lux | 7 lux | 3 lux | NA | NA | NA |
| 90 Deg fitting | 11 lux | 7 lux | 3 lux | NA | NA | NA |

Example 6B

Another experiment conducted shows comparison of Luminous efficiency of a 45 W LED lighting device with sodium lights of 250 W at different angles.

| | Fitting of street lights of 45 W LED | | | Fitting of Sodium lights of 250 W | | |
|---|---|---|---|---|---|---|
| Angle | 3 m distance | 6 m distance | 10 m distance | 3 m distance | 6 m distance | 10 m distance |
| Straight Connection | 26 lux | 17 lux | 6 lux | 22 lux | 13 lux | 6 lux |
| 45 Deg fitting | 26 lux | 14 lux | 5 lux | 22 lux | 13 lux | 5 lux |
| 90 Deg fitting | 10 lux | 8 lux | 3 lux | 6 lux | 5 lux | NA |

Financial Benefits:

1. 67% to 72% saving in the electricity consumption.
2. Minimum maintenance charge.

It is found through estimation that if LED street lights are implemented in all the places through out the world, the benefits will be as below:

1) Saving in electricity 1.9×1020 Joules
2) Remarkable decrease in consumption of electricity.
3) Financially, saving of 1.83 Trillion dollars
4) Prevention of addition of 10.68 Giga tons of carbon dioxide to the environment.
5) The electricity produced in about 280 electricity production centres, which is being used in illuminating the street lights, can be used for different purposes.

Example 7

Another experiment was conducted which shows the comparison result between High Pressure Sodium Lamp (HPS) and our solid state lighting apparatus.

| | |
|---|---|
| Model | 48 W LED Street Light vs 255 H.P. Sodium Vapor Lamp |
| Test Procedure referred | T-EQP/035 |

Test facilities used:

| Nomenclature | Make/Model | SI. Number |
|---|---|---|
| 1) Single & Three Phase Analyzer | Infratek/106A-3/0.05 | 01054012 |
| 2) Power Quality Analyzer | Fluke/434 | DM910008 |
| 3) Digital Illumination Meter | Yokogawa/510 02 | 020191 |

Test Results

| Sr. No | Test Parameters | Test method/Requirements | Observation |
|---|---|---|---|
| 1 | Power Consumption | When the LED Lamp is operated with Rate Voltage 230 volt A.C. and Rated frequency 50 Hz, the total power consumption shall be measured | 50.04 w |
| 2 | Input Power Factor | Input power factor shall be measured at rated voltage 230 volt A.C. and Rated frequency 50 Hz | 0.997 |
| 3 | Input Voltage Range | When the LED Lamp is operated with input voltage range from minimum to maximum operating range, output lux shall be measured at approximately 5 feet height | 45 volt-200 lux<br>96 volt-550 lux<br>230 volt-560 lux<br>263 volt-560 lux |
| 4 | Distortion Level (Total Harmonics Distortion of input current) | The total harmonic distortion of the input current shall be meausred When the LED Lamp is operated at its rated voltage 230 volt A.C. and Rated frequency 50 Hz | 18.2% |

-continued

| Sr. No | Test Parameters | Test method/Requirements | Observation |
|---|---|---|---|
| 1 | Power Consumption | When the HPS Lamp is operated with Rate Voltage 230 volt A.C. and Rated frequency 50 Hz, the total power consumption shall be measured | 255 W |
| 2 | Input Power Factor | Input power factor shall be measured at rated voltage 230 volt A.C. and Rated frequency 50 Hz | 0.395 |
| 3 | Input Voltage Range | When the HPS Lamp is operated with input voltage range from minimum to maximum operating range, output lux shall be measured at approximately 5 feet height | 183 volt-326 lux<br>230 volt-1800 lux<br>258 volt-2600 lux |
| 4 | Distortion Level (Total Harmonics Distortion of input current) | The total harmonic distortion of the input current shall be meausred When the HPS Lamp is operated at its rated voltage 230 volt A.C. and Rated frequency 50 Hz | 13.0% |

Example 8

Yet another on-site Installation experimental data is as follows:

| INSTALLATION DATA Voltage: 120 | | | | | | | |
|---|---|---|---|---|---|---|---|
| LOCATION | SL# | EXISTING FIX. TYPE | EXISTING LOAD | EXISTING Fe | RPL. FIX. TYPE | POST RPL LOAD | POST RPL Fe |
| Sidney St. | 31442 | 150 w HPS | 2.63a | 2.43 | 48 w LED | .52a | 3.33 |
| Sidney St. | 21592 | 150 w HPS | 2.58a | 2.14 | 48 w LED | .52a | 2.62 |
| Sidney St. | 25339 | 150 w HPS | 2.10a | 2.76 | 48 w LED | .52a | 2.63 |

The solid state lighting apparatuses of our invention have applications and customized for utilities including but not limited to stand alone lighting purposes. Industrial Indoor lighting purposes, indoor domestic commercial purposes, street light purposes, flood light purposes, high mast purposes, stadiums and other public spaces like air ports, etc.

The preceding description has been presented with reference to various embodiments of the invention. Persons skilled in the art and technology to which this invention pertains will appreciate that alterations and changes in the described apparatuses and methods of operation can be practiced without meaningfully departing from the principle, spirit and scope of this invention.

ADVANTAGES OF THE INVENTION

The solid state lighting apparatuses of the proposed invention having the following advantages a) Helps Conserve Electricity.

b) High Input Power Factor (0.98) eliminates electrical Losses.

c) Low Harmonic Distortion (THD<15%): Eliminates the cable heating caused by high level of Harmonic distortion of conventional Lights.

d) High Color Rendering Index (CRI≥0.80): The natural color spectrum of white LED Street light of our invention allows a clear visual identification of forms and colors. This increases night security and also guarantees better video images from security camera systems.

e) Long Life (>50,000 Hours): While most conventional gas discharge lamps can only be used for 5000 hours, the LED Street Light of our invention has an average life span of more than 50000 hours.

f) Low Heat Emission and Ultra Low Carbon Foot Print: To reduce carbon footprint is the need of the hour. The next ten years are very crucial for the survival of this Planet. Introduction and implementation of Energy efficient Projects is an absolute MUST. By introducing LEDs in the Illumination Sector, more than 80% of energy can be saved. The conventional Lights generate a lot of heat, due to which the Air conditioners get more loaded and the compressors run for a longer time. LEDs help in reducing heat and therefore save the run time of Air conditioners. In turn, there is an indirect savings in energy in this case (INDOOR APPLICATION).

g) Environmentally Friendly and Recognized Green Technology: LED street light of our invention are environmentally friendly right from the selection of raw material, the manufacturing process, the function of energy saving on installation, long Life and 99% of the fixture can be recycled after the life span. The LED Lights are recognized as GREEN TECHNOLOGY Products Globally.

h) No Light Pollution: Because LED Street light of our invention can be precisely directed, Light pollution is minimal. This does not only help astronomers observing the night skies, it also protects many animals as well as human health and i) Insect-Friendliness: Since the street Light of LED of our invention is less appealing to many night-active insects, almost no insects die in the lamps, which also greatly reduces cleaning and maintenance costs.

j) Scrap value at end of life cycle is substantial k) Welding operation is done to keep minimal metal grain structure undisturbed.

What is claimed is:

1. A solid-state lighting apparatus comprising:

a fixture having a mounting surface, the fixture made of a thermally conductive sheet metal, the fixture is a primary heat sink and dissipates heat in an x axis and a y axis, relative to each other, of the fixture, wherein the fixture has a thickness between 0.5 and 6.0 millimeters, wherein the primary heat sink further comprises a first primary heat sink and a second primary heat sink, the first primary heat sink being a separate unitary structure from the second primary heat sink, wherein at least one of a thermal isolator and a buffer space is positioned between the first primary heat sink and the second primary heat sink;

an anodized coating covering the fixture, the anodized coating configured to prevent corrosion and increase thermal conductivity;

a metal core printed circuit board (MCPCB) mounted on the mounting surface;

a power supply unit enclosed within a housing in the fixture, the power supply unit configured to generate an output voltage, wherein the power supply unit is configured to achieve a power factor greater than 0.98;

a solid-state light-emitting source mounted on the MCPCB, the solid-state light-emitting source coupled to the power supply unit, wherein the solid-state light emitting source is one of a Light Emitting Diode (LED), an Organic Light Emitting Diode (OLED), and a Polymer Light Emitting Diode (PLED);

a base plane extending from one end of the fixture, wherein the base plane is adjustably inclined with respect to a ground in order to control a photometry of the solid state light emitting source;

a secondary heat dissipating panel mounted at a rear of the fixture, wherein the secondary heat dissipating panel is a secondary heat sink, and wherein the secondary heat dissipating panel is made from a thermally conductive material selected from a set of aluminum, iron, steel, and copper;

a sensor coupled to the power supply unit for selectively controlling power delivery to the solid-state light-emitting source, wherein the sensor is one of a photo sensor or a motion sensor;

a lens mounted on the solid-state light-emitting source to focus a light output from the solid-state light-emitting source, wherein the lens prevents light scatter; and a metallic thermal interface positioned in a cut-out opening of the first primary heat sink, wherein the heat is dissipated from the MCPCB through the metallic thermal interface and to the second primary heat sink.

2. The lighting apparatus of claim 1, wherein the power supply unit is an AC or DC power supply unit.

3. The lighting apparatus of claim 1, wherein the fixture comprises a hole, the hole configured to provide heat dissipation and wind resistance.

4. The lighting apparatus of claim 1, wherein the secondary heat dissipating panel comprises a hole, the hole configured to provide heat dissipation and wind resistance.

5. The lighting apparatus of claim 1, further comprising a protective transparent sheet covering the solid-state light-emitting source, the sheet made from glass or plastic.

6. The lighting apparatus of claim 1, wherein the lighting apparatus is configured to achieve ingress protection standards.

7. The lighting apparatus of claim 1, wherein the thermally conductive sheet metal is aluminum, iron, steel, or copper.

8. The lighting apparatus of claim 1, further comprising a thermal interface material placed between the fixture and the MCPCB.

9. The solid-state lighting apparatus of claim 1, wherein the metallic thermal interface is not in contact with the first primary heat sink.

10. A solid-state lighting apparatus comprising:

a fixture having a mounting surface, the fixture made of a thermally conductive sheet metal, wherein the fixture is a primary heat sink and dissipates heat through at least a thickness thereof, wherein the fixture has a thickness between 0.5 and 6.0 millimeters;

an anodized coating covering the fixture, the anodized coating configured to prevent corrosion and increase thermal conductivity;

a metal core printed circuit board (MCPCB) mounted on the mounting surface;

a power supply unit enclosed within a housing in the fixture, the power supply unit configured to generate an output voltage;

a solid-state light-emitting source mounted on the MCPCB, the solid-state light-emitting source coupled to the power supply unit, wherein the solid-state light emitting source further comprises at least one of a Light Emitting Diode (LED), an Organic Light Emitting Diode (OLED), and a Polymer Light Emitting Diode (PLED);

a secondary heat dissipating panel constructed from a thermally conductive material and mounted at a rear of the fixture, the secondary heat dissipating panel being separate from the primary heat sink, wherein the primary heat sink is positioned between the MCPCB and the secondary heat dissipating panel;

at least one threaded fastener engaged between a clamp positioned exterior of the secondary heat dissipating panel and the MCPCB, wherein the at least one threaded fastener is positioned through the MCPCB, the primary heat sink, and the secondary heat dissipating panel; and a third heat dissipating panel positioned between the MCPCB and the primary heat sink, wherein the at least one threaded fastener is positioned through the MCPCB, the primary heat sink, the secondary heat dissipating panel, and the third heat dissipating panel.

11. The solid-state lighting apparatus of claim 10, further comprising a thermal interface positioned between each of: the MCPCB and the third heat dissipating panel; the third heat dissipating panel and the primary heat sink; and the primary heat sink and the secondary heat dissipating panel.

12. The solid-state lighting apparatus of claim 10, further comprising a photo sensor coupled to the power supply unit, the photo sensor selectively controlling power delivery to the solid-state light-emitting source.

13. The solid-state lighting apparatus of claim 10, further comprising a motion sensor coupled to the power supply unit, the motion sensor selectively controlling power delivery to the solid-state light-emitting source.

14. The solid-state lighting apparatus of claim 10, further comprising a lens mounted on the solid-state light-emitting source, the lens configured to focus light output from the solid-state light-emitting source, and the lens further configured to prevent light scatter.

15. A solid-state lighting apparatus comprising:

a fixture having a mounting surface, the fixture made of a thermally conductive sheet metal, wherein the fixture is a primary heat sink and dissipates heat through at least a thickness thereof, wherein the fixture has a thickness between 0.5 and 6.0 millimeters;

an anodized coating covering the fixture, the anodized coating configured to prevent corrosion and increase thermal conductivity;

a metal core printed circuit board (MCPCB) mounted on the mounting surface;

a power supply unit enclosed within a housing in the fixture, the power supply unit configured to generate an output voltage;

a solid-state light-emitting source mounted on the MCPCB, the solid-state light-emitting source coupled to the power supply unit, wherein the solid-state light emitting source further comprises at least one of a Light Emitting Diode (LED), an Organic Light Emitting Diode (OLED), and a Polymer Light Emitting Diode (PLED);

a secondary heat dissipating panel constructed from a thermally conductive material and mounted at a rear of the fixture, the secondary heat dissipating panel being separate from the primary heat sink, wherein the primary heat sink is positioned between the MCPCB and the secondary heat dissipating panel;

at least one threaded fastener engaged between a clamp positioned exterior of the secondary heat dissipating panel and the MCPCB, wherein the at least one threaded fastener is positioned through the MCPCB, the primary heat sink, and the secondary heat dissipating panel; and at least one isolating bushing positioned surrounding the at least one threaded fastener, wherein the at least one threaded fastener is separated from the MCPCB, the primary heat sink, and the secondary heat dissipating panel with the isolating bushing.

* * * * *